United States Patent [19]

Dawkins

[11] Patent Number: 5,458,858
[45] Date of Patent: Oct. 17, 1995

[54] INTEGRATED PROCEDURE FOR HIGH YIELD PRODUCTION OF CHLORINE DIOXIDE

[75] Inventor: John L. Dawkins, Derby, Kans.

[73] Assignee: Vulcan Chemicals, Wichita, Kans.

[21] Appl. No.: 193,219

[22] Filed: Feb. 8, 1994

[51] Int. Cl.[6] .................... B01J 8/00; F28D 7/00; A61L 9/00
[52] U.S. Cl. .................... 422/234; 422/129; 422/200; 422/201; 422/235; 422/305
[58] Field of Search .................... 422/129, 200, 422/201, 234, 235, 239, 240, 305; 423/478–480

[56] References Cited

U.S. PATENT DOCUMENTS

| | | | |
|---|---|---|---|
| 1,499,898 | 7/1924 | Wolf | 422/236 |
| 3,502,443 | 3/1970 | Westerlund | 423/478 |
| 3,607,027 | 9/1971 | Westerlund | 423/478 |
| 3,895,100 | 7/1975 | Cowley | 423/478 |
| 3,975,505 | 8/1976 | Fuller | 423/478 |
| 4,137,296 | 7/1979 | Glew et al. | 423/478 |
| 4,336,228 | 6/1982 | Cowley | 422/129 |
| 4,851,198 | 7/1989 | Lohrberg | 422/193 |

FOREIGN PATENT DOCUMENTS

| | | |
|---|---|---|
| 461586 | 12/1949 | Canada . |
| 782574 | 4/1968 | Canada . |
| 956783 | 10/1974 | Canada . |
| 956784 | 10/1974 | Canada . |
| 976726 | 10/1975 | Canada . |
| 1049950 | 9/1979 | Canada . |
| 1136378 | 11/1982 | Canada . |
| 1195477 | 10/1985 | Canada . |

Primary Examiner—Robert J. Warden
Assistant Examiner—Christopher Y. Kim
Attorney, Agent, or Firm—Louis Weinstein

[57] ABSTRACT

The present invention uses a new approach to generating chlorine dioxide. This approach is the use of two vessel system in which the first vessel is of a structure which enables operation to create substantially isothermal incomplete reaction conditions and in which the second vessel is of a structure to enable operation to generate a continuous decreasing temperature gradient from bottom to top thereof for substantially-completing that reaction.

11 Claims, 4 Drawing Sheets

INTEGRATED PROCEDURE FOR HIGH YIELD PRODUCTION OF CHLORINE DIOXIDE

BACKGROUND OF THE INVENTION (i) Field of the Invention

This invention relates to the production of chlorine dioxide, and more particularly to an improved integrated process and integrated system for producing chlorine dioxide continuously, efficiently and rapidly with high yields.

(ii) Description of the Prior Art

Chlorine dioxide has been industrially employed as a bleaching agent by the cellulose pulp industry for over half a century. The industrial production of chlorine dioxide has grown substantially over the years.

The demand for chlorine dioxide is projected for significant growth in the next decade because many pulp mills are committed towards substitution of chlorine through the use of chlorine dioxide. This substitution is a result of new regulations worldwide limiting the pulp mills effluent of chlorinated organics. In addition, the delignification and bleaching of pulp should be carried out without the production of chloroform, furans and dioxins.

This substitution of chlorine by chlorine dioxide represents an increased cost to pulp mills due to the higher cost of an equivalent amount of chlorine dioxide. Furthermore, the conventional chlorine dioxide plants yield, as by-products, spent acid, salt cake and sodium chlorate. This acid solution, and/or slurry (if the salt cake is crystallized) is undesirable to pulp mills because, when fed to the chemical recovery system, it can be the cause of production down time and maintenance costs associated with the boiler tubes.

In the well-known process for generating chlorine dioxide, sodium chlorate reacts with hydrogen chloride in an aqueous solution to yield chlorine dioxide, chlorine, and sodium chloride. The chemical expression of this reaction may be written:

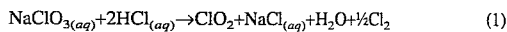

$$NaClO_{3(aq)} + 2HCl_{(aq)} \rightarrow ClO_2 + NaCl_{(aq)} + H_2O + \tfrac{1}{2}Cl_2 \qquad (1)$$

This chemical process also has a waste reaction, a reaction that consumes sodium chlorate without making chlorine dioxide. The chemical expression for this reaction may be written:

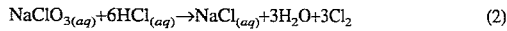

$$NaClO_{3(aq)} + 6HCl_{(aq)} \rightarrow NaCl_{(aq)} + 3H_2O + 3Cl_2 \qquad (2)$$

The efficiency of the reaction is the fraction of a mole of chlorine dioxide generated per mole of sodium chlorate consumed. If one whole mole of chlorine dioxide is generated per mole of sodium chlorate consumed, the efficiency is 100%. By this definition, reaction is more efficient when the first reaction is more dominant. Also, where this reaction is less efficient, the ratio of chlorine generated to chlorine dioxide generated increases.

Efficiency is a complex function of concentration and temperature. Generally, the first reaction is more dominant at lower temperatures (which means higher efficiency). High sodium chlorate concentrations seem to favour high efficiency.

The production rate is also a complex function of concentration and temperature. Generally, the reaction is faster at higher temperatures (which means faster production rates). Generally, the reaction is slower at lower concentrations (which means slower production rates).

To minimize reaction (2), it has been suggested to react properly proportioned mixtures of chlorates, chlorides and a strong inorganic acid in strong solutions (containing at least 50% and up to 75% of water) at temperatures below 60° C. Based on reaction (1), equivalent ratios of $Cl^-/ClO_2 = 2$ and of $H^+/ClO_3^- = 2$ should give high yields of $ClO_2$ per mole of chlorate decomposed. In practice, however, it has been proposed in particular to use a ratio of $H^+/ClO_3^-$ in excess of 2 because reaction (2) uses some of the chlorate in producing chlorine instead of $ClO_2$. This proposal results in the use of excessive quantities of reactants.

Since chlorine dioxide is extremely explosive at high temperatures, the reactions described hereinabove have generally been carried out at relatively low temperatures. Furthermore, in order to reduce still further the danger of explosion, a non-reactive (inert) gas has generally been conducted into the reaction vessel. The purpose of the gas was to reduce the concentration of chlorine dioxide in the vessel to a nonexplosive proportion. In processes where gaseous hydrogen chloride was used or where large amounts of inert gases were used, there was a need for a rather large compressor. The need for such compressor involved increased capital and operating costs.

Furthermore, it has been recognized that a high yield of $ClO_2$ per mol of chlorate decomposed, while desirable, is not alone sufficient to make the process economical for large scale production of chlorine dioxide. As a matter of practical necessity, it has therefore been recommended that the decomposition of the chlorate initially present be carried substantially to completion to avoid any appreciable waste of this valuable raw material. However, the requirement of consuming all, or almost all, of the chlorate entails inherent difficulties which greatly decrease the efficiency, rapidly and therefore the economy of the older process. One difficulty is the fact that the average hourly output of $ClO_2$ is necessarily low because the reaction rate decreases considerably as the concentration of the reactants, particularly of chlorate, decreases. The use of solutions of low chlorate content further magnifies this effect and wastes valuable space in the reaction chamber. Finally, as the concentration of chlorate decreases, reaction (2) contributes increasingly to the decomposition of the chlorate whereby the overall yield of chlorine dioxide is lowered.

There are many patents directed to the preparation of chlorine dioxide by introducing an aqueous solution of sodium chlorate and sodium chloride and an acidic agent into a reaction vessel in a continuous manner and by way of an integrated process and integrated apparatus.

An integrated chlorine dioxide plant is a plant that has four main process systems:

one process system is the generator. This system generates chlorine dioxide from strong brine and hydrochloric acid. Chlorine dioxide leaves the generator system as part of a gas mixture containing chlorine and water vapour. The strong brine is converted to weak brine as it passes through the generator system.

Another process system is the electrolysis system. This system receives weak brine from the generator system, strengthens the sodium chlorate concentration in the brine, and returns the strong brine to the generator system. This system produces a hydrogen gas co-product.

Another process system is the hydrochloric acid synthesis system. This system combines hydrogen gas from the electrolysis system with fresh chlorine and recycled chlorine to make hydrogen chloride. The hydrogen chloride is absorbed into water to make hydrochloric acid. Hydrochloric acid is forwarded to the generator system.

The remaining process system is the chlorine dioxide absorption system. This system draws the gas mixture from the generator system and contacts the it with water. Chlorine dioxide, water vapour, and some of the chlorine in the gas mixture are absorbed into water solution. The chlorine dioxide solution is forwarded to its end use. The unabsorbed chlorine is compressed and sent to the hydrochloric acid synthesis system as recycle chlorine.

The integrated plant places specific demands on the generating system. The generating system produces weak brine that flows back to the electrolysis system. It is important that the residual hydrogen chloride in the weak brine be low enough so that it does not interfere with the operation of the electrolysis system. If the hydrogen chloride concentration is too great, the electrolysis system will generate excess chlorine and electrolysis efficiency will be impaired. Even worse, the excess chlorine will be evolved in the hydrogen gas stream, thus creating an explosion hazard. Another demand placed on the generating system is maintaining the water balance in the strong brine/weak brine loop. Excess water enters the strong brine/weak brine loop from the water content of the hydrochloric acid stream. The water balance is maintained by operating the generating system to evaporate the excess water.

The pulp and paper industry is the main market for large chlorine dioxide generators. That industry uses chlorine dioxide to bleach pulp so that white paper can be made from it. Because of environmental concerns, the pulp and paper industry prefers that chlorine dioxide be delivered to their bleach process with a minimum of the chlorine co-product. Therefore, it is important that chlorine dioxide generators be efficient to minimize the cost of equipment and resources required to separate chlorine from the chlorine dioxide product.

Among the patents are the following:

Canadian Patent 461,586 patented Dec. 6, 1949 by G. A. Day which provided a process for the manufacture of chlorine dioxide by supplying an aqueous solution of an inorganic chlorate to the reaction chamber, and gaseous hydrogen chlorides The hydrogen chloride was supplied to the chamber in an amount insufficient to react with all the chlorate present therein. The resulting acid was reacted with the chlorate. Gaseous chlorine dioxide and chlorine were removed from the reaction chamber. Partially-reacted chlorate solution from the reaction chamber was passed to an electrolytic chlorate cell to increase the chlorate content thereof. The fortified chlorate solution was returned to the reaction chamber for further reaction with hydrogen chloride. The low amount of chloride in the electrolytic chlorate liquor did not always serve to prevent the precipitation of chloride salts during the primary reaction to form the chlorine dioxide. Such precipitation of chloride salts reduced the efficiency of the production of chlorine dioxide generator.

Canadian Patent 782,574 patented Apr. 9, 1968 by G. O. Westerlund, which provided an improved continuous recyclic process and apparatus for the production of chlorine dioxide. That patented process involved the first step of effecting electrolysis of an aqueous solution of a metal chloride to form an aqueous solution of a metal chlorate and gaseous hydrogen. The gaseous hydrogen was reacted with gaseous chlorine to form gaseous hydrogen chloride. The aqueous solution of metal chlorate was reacted with the gaseous hydrogen chloride to form an aqueous solution of metal chloride, which was recycled to the first step and an aqueous solution of chloric acid. The aqueous solution of chloric acid was reacted with the gaseous hydrogen chloride to form chlorine dioxide, which was recovered, water and gaseous chlorine, which was recycled to the second step. Such process was thus based on a system which required water, chlorine and electric current for the production of chlorine dioxide. This process suffered from the problem that the ratio of $ClO_2$ to $Cl_2$ produced from the absorber was not controlled to be sufficiently high.

Canadian Patent No. 956,783 patented Oct. 29, 1979 by D. G. Hatherly, provided a method of forming chlorine dioxide which included forming an aqueous reaction medium containing an alkali metal chlorate and hydrochloric acid in a reaction zone. The aqueous reaction medium was heated preferably to its boiling temperature while the reaction zone was maintained under a reduced pressure to prevent spontaneous decomposition of chlorine dioxide as it was evolved. This reaction generated chlorine dioxide and chlorine, and evaporated water from the medium. The chlorine dioxide and chlorine were removed from the reaction zone along with the evaporated water. The aqueous reaction medium was formed by the steps of electrolyzing an aqueous solution of an alkali metal chloride to form an aqueous solution of an alkali metal chlorate and hydrogen, then feeding the aqueous solution of the alkali metal chlorate to the reaction zone, then forming hydrogen chloride by reaction between approximately one-third of the whole amount of the hydrogen and chlorine, and finally feeding the hydrogen chloride to the reaction zone.

Canadian Patent No. 956,784 patented Oct. 29, 1974 by J. D. Winfield, provided a process for the preparation of chlorine dioxide. The patented process involved forming an aqueous reaction medium containing an alkali metal chlorate and hydrochloric acid in a reaction zone by feeding hydrochloric acid and an aqueous solution of the alkali metal chlorate to the reaction zone. The aqueous reaction medium was heated to effect reaction between the alkali metal chlorate and hydrochloric acid to generate chlorine dioxide and chlorine and to evaporate water from the medium under reduced pressure. The chlorine dioxide and chlorine were removed from the reaction zone as a gaseous mixture consisting of chlorine dioxide and chlorine and evaporated water.

Canadian Patent No. 976,726 patented Oct. 28, 1975 by G. Cowley provided a continuous method of producing chlorine dioxide which included continuously maintaining a chlorine dioxide-producing reaction medium in a reaction zone. The reaction medium contained an alkali metal chlorate, a reducing agent capable of reducing the alkali metal chlorate to chlorine dioxide and chlorine and a strong mineral acid. Chlorine dioxide and chlorine were continuously generated from the reaction medium and water was continuously evaporated from the reaction medium at substantially the boiling point thereof while the reaction medium was maintained under a reduced pressure. A gaseous mixture consisting of the generated chlorine dioxide and chlorine and the evaporated water was removed from the reaction zone. Chlorine dioxide was continuously recovered from the gaseous mixture. An alkali metal salt of the anion of the strong acid was continuously depositing in the reaction zone. A slurry containing deposited alkali metal salt and part of the reaction medium was continuously removing from the reaction zone. A recycle mixture having a reduced alkali metal salt solids content and containing make-up quantities of alkali metal chlorate and reducing agent, except that the reducing agent was omitted from the recycle mixture when the strong mineral acid also provides the reducing agent was continuously formed. The recycle mixture was heated to the boiling point of the reaction medium at the prevailing absolute pressure in the reaction zone. The heated mixture was accelerated to establish a back pressure exceeding the difference in saturation vapour pressure of the heated mixture and of the reaction medium. A strong mineral acid was added to the accelerated beaten mixture at the maximum velocity of the mixture resulting from the acceleration to provide a feed material for the reaction zone. Gaseous material in the feed material was allowed to expand while a low rate of acceleration was maintained. The expanded feed mixture was fed to the reaction zone at a level above the liquid level in the reaction zone. The level of liquid in the reaction zone was maintained substantially constant. A problem with this patented process is the disposal of the precipitated salts.

Canadian Patent No. 1,049,950 patented Mar. 6, 1979 by J. D. Winfield, provided an integrated process for the production of chlorine dioxide. Such integrated process involved providing an aqueous acid reaction medium containing sodium chlorate and hydrochloric acid in the reaction zone. The sodium chlorate was continuously in reduced with the hydrochloric acid predominantly accordance with the equation:

$$NaClO_3 + 2HCl \rightarrow ClO_2 + \tfrac{1}{2}Cl_2 + H_2O + NaCl$$

thereby continuously generating chlorine dioxide and chlorine, while simultaneously continuously evaporating water from the aqueous reaction medium as a gaseous mixture of chlorine dioxide, chlorine and steam from the reaction zone. The reaction zone was continuously maintained under a reduced pressure. Sodium chlorate and hydrogen chloride were continuously added to the reaction medium at rates equivalent to their rates of consumption to form chlorine dioxide and chlorine. The water was evaporated from the reaction medium at a rate sufficient to maintain a substantially constant volume of aqueous reaction medium in the reaction zone. Sodium chloride was removed from the reaction zone, either in solid form or in solution in the aqueous reaction medium. An aqueous solution of the removed sodium Chloride was continuously electrolyzed to form an aqueous solution of sodium chlorate and gaseous hydrogen in accordance with the equation:

$$NaCl + 3H_2O \xrightarrow{electrolysis} NaClO_3 + 3H_2$$

That aqueous solution of sodium chlorate was fed to the reaction medium, the rate of production of sodium chlorate from sodium chloride in the electrolysis being sufficient to maintain the rate of addition of sodium chlorate to the reaction medium. The gaseous mixture of chlorine dioxide, chlorine and steam was continuously removed from the reaction zone. The steam was continuously cooled and chlorine was continuously separated from the mixture. An aqueous solution of the chlorine dioxide was continuously produced and was continuously removed. A chlorine reactant stream was continuously formed by mixing feed chlorine with the chlorine separated from the mixture. The chlorine in the reactant stream was continuously reacted with the substantially stoichiometric quantity of gaseous hydrogen to form hydrogen chloride in accordance with the equation:

$$H_2 + Cl_2 \rightarrow 2HCl$$

the hydrogen which was reacting with the chlorine was provided by the hydrogen formed in the production of the sodium chlorate. That hydrogen chloride was continuously fed in the reaction medium in gaseous form or as hydrochloric acid, the rate of production of hydrogen chloride, and hence the rate of addition of feed chlorine to the system being sufficient to maintain the rate of addition of hydrogen chloride to the reaction medium. Excess hydrogen was continuously discharged from the system. A problem with this patented process is the increased cost due to the additional equipment necessary to recycle the precipitated salts.

U.S. Pat. No. 2,484,402 patented Oct. 11, 1949 to G. A. Day et al, provided a cyclic process which involved reacting solutions of chlorates with hydrochloric acid, the acid being supplied in an amount substantially less than the equivalent stoichiometric ratio of $H+/ClO_3^- = 2$ of the chlorine dioxide producing reaction, thereby decomposing at any one time only a fraction of the available chlorate, the decomposition thus proceeding at a particularly rapid rate. The chlorate content of the partially spent solution was enriched, as for example, by feeding it to an electrolytic chlorate cell. The fortified solution was returned to the reaction chamber to treat it again with a stoichiometrically insufficient amount of acid. This cycle was repeated, whereby substantially all the chlorate supplied was eventually efficiently decomposed, producing mixtures of chlorine dioxide and chlorine containing high proportions of chlorine dioxide.

U.S. Pat. No. 3,404,952 patented Oct. 8, 1968 by G. O. Westerlund, provided a continuous process for the production of chlorine dioxide. The process included effecting electrolysis of an aqueous solution of a metal chloride, in order to form an aqueous solution of a metal chlorate, and gaseous hydrogen. The gaseous hydrogen was reacted with gaseous chlorine, in order to form gaseous hydrogen chloride. The aqueous solution of metal chlorate was reacted with the gaseous hydrogen chloride in order to form an aqueous solution of metal chloride, which was recycled to the first step and an aqueous solution of chloric acid. The aqueous solution of chloric acid was reacted with the gaseous hydrogen chloride in order to form chlorine dioxide, which was recovered water, and gaseous chlorine which was recycled to the second step.

U.S. Pat. No. 3,524,728 patented Aug. 18, 1970 by G. O. Westerlund, provided a closed cycle system for the generation of chlorine dioxide. The system included an electrolytic apparatus for the generation of an aqueous solution of chlorate. The electrolytic apparatus included a liquor inlet, a liquor outlet and a gas outlet. Generator apparatus was provided for generating chlorine dioxide from the chlorate solution and hydrogen chloride. That apparatus included a liquor inlet, a liquor outlet, a gas inlet and a gas outlet. The liquor outlet of the electrolytic apparatus was connected to the liquor inlet of the generator apparatus. Combustion apparatus was provided for the conversion of the cell gases from the electrolytic apparatus to hydrogen chloride. The combustion apparatus included a gas inlet and a gas outlet. The gas outlet of the electrolytic apparatus was connected to a gas inlet of the apparatus. The gas outlet of the combustion apparatus was connected to the gas inlet of the generator apparatus. A separator was provided for separating chlorine dioxide from gaseous chlorine, such separator including a gas inlet, a gas outlet, a liquid inlet and a product outlet. The gas outlet of the generator apparatus was connected to the gas inlet of the separator. The gas outlet of the separator was connected to the gas inlet of the combustion apparatus. The gas outlet of the separator was connected to the gas inlet of the generator apparatus. In this integrated plant a crystallizing generator is used. Solid sodium chloride crystals were generated in the crystallizing generator. The solid sodium chloride crystals were separated from the generator solution and were forwarded to the electrolysis area. Prior to electrolysis, the solid sodium chloride is dissolved in water and then was returned to the cells. A problem with this patented process is that additional equipment is required to recycle the salts.

U.S. Pat. No. 3,607,027 patented Sep. 21, 1971 by G. O. Westerlund provided an improved process for preparing chlorine dioxide wherein the bulk of the reactants were internally produced. The reactants included an aqueous solution of an inorganic chlorate and an aqueous hydrochloric acid. The aqueous solution of the inorganic chlorate was produced by electrolyzing an aqueous solution of an inorganic chloride. The aqueous hydrochloric acid was produced from hydrogen gas, which was a by-product of the electrolysis reaction by which the inorganic chloride was converted to the inorganic chlorate, and chlorine gas, followed by dissolving in water. In reacting the aqueous inorganic chlorate with the aqueous hydrochloric acid, both gaseous chlorine dioxide and gaseous chlorine were formed. The gaseous chlorine was separated from the gaseous chlorine dioxide. A portion of the so-separated gaseous chlorine was reacted with the hydrogen to form gaseous hydrogen chloride. The gaseous hydrogen chloride was used as a reactant, either by dissolving it in a stoichiometrically-insufficient quantity of water, thereby to provide an aqueous solution of hydrochloric acid and free hydrogen chloride gas, or by dissolving it in water containing absorbed chlorine gas.

U.S. Pat. No. 3,929,974 patented Dec. 30, 1975 by J. D. Winfield provided a process for the production of chlorine dioxide by continuously feeding an aqueous solution of an alkali metal chlorate and hydrochloric acid to a reaction zone to maintain an aqueous reaction medium in the reaction zone containing an alkali metal chlorate and hydrochloric acid. Chlorine dioxide and chlorine were continuously formed by reaction between the alkali metal chlorate and the hydrochloric acid in the reaction zone. The reaction zone was continuously maintained under a reduced pressure. The medium in the reaction zone was continuously maintained at its boiling point to evaporate water from the reaction medium continuously to form a gaseous phase in the reaction zone consisting of a mixture of chlorine dioxide, chlorine and water vapour, and to deposit alkali metal chloride in the reaction zone. The gaseous phase mixture was continuously conducted out of the reaction zone. Chlorine dioxide was continuously recovered from the mixture. Deposited alkali metal chloride was removed from the reaction zone. An aqueous solution was formed from the removed alkali metal chloride. That aqueous solution was continuously electrolyzed to convert the alkali metal chloride at least partially to alkali metal chlorate and to generate hydrogen gas. The alkali metal chlorate-containing solution was continuously fed to the reaction zone. The hydrogen gas was continuously reacted with chlorine gas to generate hydrogen chloride. Hydrochloric acid was continuously formed from the hydrogen chloride. That hydrochloric acid was continuously fed to the reaction zone. A problem with this patented process is the increased cost due to the additional equipment necessary to recycle the salts.

U.S. Pat. No. 4,543,243 patented Sep. 24, 1985 by H. Fröhler, provided a process for the continuous production of chlorine dioxide. An alkali metal chlorate solution containing alkali chloride was reacted with hydrochloric acid to form a gaseous mixture of $ClO_2$ and $Cl_2$ and an alkali metal chloride solution depleted of chlorate, in a cascade reactor under an under reduced pressure at the outlet of the cascade reactor. A flow of air was introduced into the reactor to maintain a partial pressure of $ClO_2$. The gaseous mixture was passed into a separation column where $ClO_2$ was washed out with water to form a solution of $ClO_2$. The $Cl_2$ remaining after the $ClO_2$ had been washed out of the gaseous mixture was reacted in an HCl Synthesis furnace with hydrogen which was cathodically-formed in a chlorate-electrolysis plant, along with externally produced $Cl_2$ to give hydrochloric acid. That hydrochloric acid was introduced into the cascade reactor. The alkali metal chloride solution depleted of chlorate was withdrawn from the outlet of the reactor and was introduced into the chlorate-electrolysis plant to form chlorate and hydrogen. The chlorate solution was then recycled into the reactor and the hydrogen is introduced into the HCl-synthesis furnace.

In addition to the above patents, which related to the entire system and process for producing $ClO_2$, several patents directed to chlorine dioxide generator designs have been provided. Many of these are based on the same chemical process as described above. Many also provide for the generation of chlorine dioxide using more than one generator.

U.S. Pat. No. 2,664,341 patented Dec. 29, 1953 by E. E. Kesting provided a system in which the chlorate and hydrochloric acid solutions were caused to flow through a series of consecutive reaction vessels staggered in height, one behind the other, arranged either in the form of a cascade, or as a column. In the opposite direction, a stream of inert gas was forced or drawn through the reaction vessels. The inert gas was caused to flow through the liquid by means of gas inlet pipes extending to the bottom of the vessels. The uppermost vessel was adjusted to the lowest temperature, while the lower-most vessel had the highest temperature. Under these conditions, the current of gas flowing through the apparatus had the lowest concentration of chlorine dioxide in the vessel having the highest temperature, while the chlorine dioxide concentration increased in the vessels above the lowermost. The temperature gradually becomes lower, and finally the highest chlorine dioxide concentration was obtained in the uppermost vessel where the lowest temperature prevailed.

If the lowermost vessel was heated to a given temperature, the gas leaving such vessel had a water vapour tension corresponding to the temperature. If this gas-steam mixture now entered into the next higher vessel of the series, it came into a thermal equilibrium with the contents of that vessel, i.e., it heated the vessel and its contents. From there, the gas current passed into the next higher vessel, heating the latter, and this was continued throughout the entire series of vessels. In this way, a temperature gradient was obtained in the vessels which automatically established itself, and which was dependent on the quantity of liquid, air and heat fed. If the reaction liquid was heated in this manner from vessel to vessel to a higher temperature, the result was that the conversion of chlorate and acid to chlorine dioxide was very complete, and took place with the best yield. Despite the high temperatures employed, there was said to be no danger of explosion. Furthermore, it was possible to maintain a desired given temperature gradient in the series of vessels, it being merely necessary to control the temperature at one place, for example at the place where the heat is introduced. All other temperatures were then automatically adjusted.

This patent, then, taught a method for maximizing the efficiency of the chlorine dioxide generator while depleting hydrogen chloride to acceptable levels. As described above, this method was to mix hydrochloric acid and sodium chlorate brine in a vessel at a low temperature and then to pass the liquid mixture through a series of vessels, with each successive vessel at a higher temperature. In this process, most of the chlorine dioxide was generated at a low temperature where efficiency was highest. Then, as the hydrogen chloride was depleted, the solution would cascade to a warmer vessel. Because each vessel was operated isothermally, temperature changes from vessel to vessel were discrete. In the warmer vessel, the effect of higher temperature (which increases reaction speed) would offset somewhat the effect of diminished concentration (which slows reaction speed). This allowed for high efficiencies while depleting hydrogen chloride concentration. The chlorine dioxide and chlorine generated was diluted and swept through the generator cascade and out of the generating system by an inert gas stream of air or nitrogen.

One problem with this system was the capital cost incurred by a multiple vessel design. Another problem of the design was the use of a diluent gas that had to be handled by down-stream equipment, thereby making chlorine recycle expensive and the separation of chlorine and chlorine dioxide problematical.

U.S. Pat. No. 3,502,443 patented Mar. 24, 1970 by G. O. Westerlund provided a unitary reaction apparatus. The apparatus included a vertically-disposed, primary reactor, the primary reactor including an upper, inflow liquor recirculatory zone adjacent the top thereof, a lower, outflow, liquor recirculatory zone adjacent the bottom thereof, a lower liquor outlet zone, and an upper gas outlet zone. The primary reactor being adapted to carry out at least an initial part of a designated chemical reaction. The gas zone was provided with a frangible explosion cover. A combined liquor circulating and fresh reactant feed inlet was attached thereto and communicated between the upper liquor recirculatory zone and the lower liquor recirculatory zone. A vertically-disposed secondary reactor was provided, the secondary reactor including a lower liquor inlet zone, an upper liquor outlet zone, and an upper gas outlet zone. That gas zone was also provided with a frangible explosion cover. The secondary reactor was attached to the primary reactor and communicated therewith by means of a connection from the lower liquor outlet zone of the primary reactor to the lower liquor inlet zone of the secondary reactor. The secondary reactor was adapted to carry out at least a terminal part of the designated chemical reaction. A primary gas collection zone was provided adjacent the gas outlet zone of the primary reactor, the primary gas collection zone leading to the gas outlet zone. Gas withdrawal and collection means were connected to the upper gas outlet zone. A secondary gas collection zone was provided adjacent the gas outlet zone of the secondary reactor, the secondary gas collection zone leading to the gas outlet zone of the secondary reactor. Gas withdrawal and collection means were connected to the upper gas outlet zone of the secondary reactor. Liquor outlet means were connected to the upper liquor outlet zone of the secondary reactor for withdrawal and collection of liquor, but not of gases, from the unitary reaction vessel. This system suffered the disadvantage that no provision was made to optimize the ratio of $ClO_2$ to $Cl_2$ initially produced.

U.S. Pat. No. 4,396,592 patented Aug. 2, 1983 by J. Combroux provided a system for the production of chlorine dioxide. The system included a primary reaction zone for the introduction of an alkali metal chlorate in aqueous solution and hydrogen chloride and an inert gas at a specified temperature for a specified residence time. The system included secondary reaction zones where the reaction products, which were removed from the primary reaction zone, were filled and emptied in sequence, the temperature in each of the secondary reaction zones being equal to, or at most a specified temperature greater than, that in the primary reaction zone and for a specified residence time. This design used the technique of increasing the temperature of the acidified brine to achieve high efficiency while attempting to assure substantially complete conversion of the hydrogen chloride. This system suffered the disadvantage that no provision was made to optimize the ratio of $ClO_2$ to $Cl_2$ initially produced.

Previously referred to U.S. Pat. No. 4,543,243 by Hans Fröhler et al, taught a cascading generator, wherein the problem of the cost of multiple vessels was addressed. The generator design taught in this patent was a single vessel that was divided into sections by horizontal plates, with each plate one above the other so that the reactor was divided into a plurality of vertically-stacked sections. Each section was held at isothermal conditions, with the top section being the coolest section and the bottom section being the hottest section. Hydrochloric acid and strong brine were introduced into the top section of the reactor. The hydrochloric acid and strong brine mixture then passed downward through each section and exited the bottom of the reactor. In passing, the hydrochloric acid and strong brine mixture experienced discrete increases in temperature. Air was blown into one of the lower sections to dilute and strip the chlorine dioxide gas that was generated from the hydrochloric acid and strong brine mixture. This design used the technique of increasing the temperature of the acidified brine to achieve high efficiency while attempting to assure substantially complete conversion of the hydrogen chloride. However, the problem of the diluent air gas, as discussed previously, remained.

Previously referred to U.S. Pat. No. 4,851,198 by Karl Lohrberg taught another cascading reactor. This design was similar to the design described in U.S. Pat. No. 4,543,243, except that bubble cap trays were specified as a means to divide the reactor into sections. This patent also made provision for multiple acid injection ports, so that hydrochloric acid may be injected in more than one section. This design used the technique of increasing the temperature of the acidified brine to achieve high efficiency while attempting to assure substantially-complete conversion of the hydrogen chloride. However, the problem of the diluent gas, as discussed previously remained. The means by which the temperature of each section was positively controlled was not identified.

U.S. Pat. No. 4,938,944 patented Jul. 3, 1990 by Rainer Dworak et al provided a cascading generator. This design was a single vessel that was divided into vertically-stacked sections, and was very similar to the generator design taught in U.S. Pat. No. 4,851,198 except that a separation chamber was attached. The separation chamber was used to separate steam from the hot depleted brine that was produced from the bottom section of the generator. The steam from the separation chamber was used indirectly to heat sections of the generator. This reactor was air or nitrogen swept. The reactor was compartmentalized and the compartments were indirectly heated. This design used the technique of increasing the temperature of the acidified brine to achieve high efficiency while attempting to assure substantially-complete conversion of the hydrogen chloride. However, the problem of the diluent sweeping gas, as discussed previously remained.

Other patents provided additional designs for primary chlorine dioxide generators and their uses.

U.S. Pat. No. 4,075,308 patented Feb. 21, 1978 by W. H. Rapson et al provided a system of producing chlorine dioxide from sodium chlorate. The system included a reaction zone for the reaction of an aqueous reaction medium containing dissolved quantities of sodium chlorate, sodium chloride and hydrochloric acid, the aqueous reaction medium being substantially saturated with sodium chloride. The apparatus also included means for maintaining the reaction medium at its boiling point at the absolute pressure therein and for continuously maintaining the reaction zone under a sub-atmospheric pressure sufficient to maintain the reaction medium at its boiling point. The apparatus further included means for continuously removing, from the reaction zone, a gaseous mixture of chlorine dioxide, chlorine and steam wherein the volume ratio of steam to chlorine dioxide was greater than that below which substantial decomposition of chlorine dioxide occurred. The apparatus also included means for continuously precipitating the generated sodium chloride from the reaction medium in the reaction zone and for removing the deposited sodium chloride from the reaction zone. This design used the technique of increasing the temperature of the acidified brine to achieve high efficiency while attempting to assure substantially complete conversion of the hydrogen chloride. However, the problem of the diluent gas, as discussed previously remained. In addition, the problem of handling the slurry of sodium chloride remained.

U.S. Pat. No. 4,137,296 patented January 1974 by D. N. Glew et al provided a generator which also functioned as a crystallizer. The generator itself was simple in design, and thus had a low installed cost. However, this patent suffered the disadvantage that, to put this generator into an integrated plant, required some additional support equipment to handle slurried sodium chloride, which offset the low cost of the generator and increases the complexity of the integrated plant.

Many patents also exist for secondary chlorine dioxide generators.

Canadian Patent No. 1,136,378 patented Nov. 30, 1982 provided a system for the production of an aqueous solution of chlorine dioxide. The apparatus included an upright gas-liquid contact reaction zone. Means were provided for feeding a solution of sodium chlorate to the upper end thereof and for feeding a stream of gaseous sulphur dioxide to a lower end of the upright gas-liquid contact reaction zone. Means were provided for counter-currently contacting downwardly-flowing sodium chlorate solution and upwardly-flowing gaseous sulphur dioxide in the reaction zone to cause reaction therebetween. Means were provided for subjecting the reaction zone to a sub-atmospheric pressure which was greater than the pressure at which the reaction medium boiled. Means were provided to withdraw the gaseous chlorine dioxide therefrom at the upper end of the reaction zone. Means were provided for contacting the withdrawn gaseous chlorine dioxide with water to dissolve the chlorine dioxide therein at a flow rate of water sufficient to form an aqueous chlorine dioxide solution. This design again used the technique of increasing the temperature of the acidified brine to attempt to achieve high efficiency while attempting to assure substantially-complete conversion of the hydrogen chloride. Nevertheless, a problem with this system is that the generator system is not adaptable to an integrated design.

Canadian Patent No. 1,295,477 patented Oct. 22, 1985 provided a system of producing chlorine dioxide. The system included a reaction zone and means for continuously feeding an aqueous solution of sodium chlorate to the aqueous reaction medium in sufficient quantity to maintain a specified concentration of sodium chlorate in the reaction medium. Means were provided for continuously feeding hydrochloric acid or hydrogen chloride gas to the aqueous reaction medium. Means were provided for continuously maintaining the actual hydrogen ion concentration in the reaction medium in a specified range. Means were provided for continuously maintaining the reaction medium at its boiling point at the absolute pressure therein. Means were provided for continuously maintaining the reaction zone under a sub-atmospheric pressure sufficient to maintain the reaction medium at its boiling point. Means were provided for continuously removing from the reaction zone, a gaseous mixture of the generated chlorine dioxide, and chlorine gases and steam. Means were provided for continuously depositing the generated sodium chloride from the reaction medium in the reaction zone. Means were provided for continuously maintaining the volume of liquid in the reaction zone substantially constant. This design again uses the technique of increasing the temperature of the acidified brine to achieve high efficiency while assuring substantially complete conversion of the hydrogen chloride. However, the problem of the diluent gas, as discussed previously remains. The means by which the temperature of each section was discretely controlled is not identified within this patent. This system also suffered the disadvantage that provision had to be made to remove the precipitated salts and the salt slurry.

U.S. Pat. No. 3,895,100 patented Jul. 15, 1975 by G. Cowley provided a system for producing chlorine dioxide. The system included a reaction zone which was provided with means for maintenance at reduced pressure and means for evaporating water from the reaction medium at the boiling point thereof while the reaction medium was maintained under that reduced pressure. Means were provided for continuously removing, from the reaction zone, a gaseous mixture consisting of the generated chlorine dioxide and chlorine and the evaporated water, and for continuously recovering chlorine dioxide from the gaseous mixture. Means were provided for continuously depositing, in the reaction zone, an alkali metal salt of the anion of the strong acid, and for continuously removing, from the reaction zone, a slurry containing deposited alkali metal salt and a part of the reaction medium. Means were provided for heating the recycle mixture to the boiling point of the reaction medium at the prevailing absolute pressure in the reaction zone. Means were provided for accelerating the heated mixture to establish a back pressure to exceed the difference in saturation vapour pressure of the heated mixture and of the reaction medium. Means were provided for adding strong mineral acid to the accelerated heated mixture at the maximum velocity of the mixture resulting from the acceleration to provide a feed material for the reaction zone. Means were provided for allowing gaseous material in the feed material to expand while maintaining a low rate of acceleration. Means were provided for feeding the expanded feed mixture to the reaction zone at a level above the liquid level in the reaction zone. Means were provided for maintaining the level of liquid in the reaction zone substantially constant. This system suffered the disadvantage of having to provide means for the handling and removal of the salt slurry.

U.S. Pat. No. 3,929,974 patented Dec. 30, 1975 by J. D. Winfield provided a system for the production of chlorine dioxide. The system included a reaction zone having means for continuously maintaining the reaction zone under a reduced pressure. Means were provided for continuously maintaining the reaction medium at its boiling point to evaporate water from the reaction medium to form continuously a gaseous mixture of chlorine dioxide, chlorine and water vapour, and to deposit alkali metal chloride in the reaction zone. Means were provided for continuously conducting the gaseous phase mixture out of the reaction zone, and for continuously recovering chlorine dioxide from the mixture. Means were provided for removing deposited alkali metal chloride from the reaction zone, and for forming an aqueous solution from the removed alkali metal chloride. Means were provided for continuously electrolyzing the aqueous solution from the removed alkali metal chloride to convert the alkali metal chloride at least partially to alkali metal chlorate and to generate hydrogen gas. Means were provided for continuously feeding at least the alkali metal chlorate content of the alkali metal chlorate-containing solution to the reaction zone. Means were provided for continuously reacting at least part of the hydrogen gas with chlorine gas to generate hydrogen chloride. Means were provided for continuously forming hydrochloric acid from the hydrogen chloride, and for continuously feeding at least part of the hydrochloric acid to the reaction zone. This system suffered the disadvantage that means has to be provided for the handling and removal of the deposited slat and the salt slurry.

U.S. Pat. No. 3,975,505 patented Aug. 17, 1976 by W. A. Fuller provided a system for continuously generating a mixture containing chlorine dioxide, chlorine and a neutral alkali metal salt. The system included a single vessel generator-evaporator-crystallizer. Means were provided for maintaining the temperature at a specified level. Means were provided for subjecting the reaction solution to a vacuum to effect evaporation of water vapour. Means were provided for withdrawing chlorine dioxide and chlorine produced by the reaction solution in admixture with the water vapour. Means were provided for crystallizing the neutral alkali metal salt of the mineral acid within the generator-evaporator-crystallizer and for withdrawing therefrom in the form of an aqueous slurry containing minor amounts of chlorate, chloride and acid values. Means were also provided for continuously passing the slurry containing neutral alkali metal salt crystals produced in the generator-evaporator-crystallizer into the top of a separatory column, in a downward flow. Means were provided for countercurrently passing a stream of hot water continuously upwardly through that column at a rate sufficient to effect washing of the downwardly flowing crystals, and for continuously and substantially completely returning chlorate, chloride and acid values recovered therefrom to the generator-evaporator-crystallizer. Means were provided for continuously removing an aqueous slurry of substantially pure neutral alkali metal sulfate salt crystals from the bottom of the separatory column. This system suffered the disadvantage that provisions had to be made to remove the salt slurry.

U.S. Pat. No. 4,543,243 patented Sep. 24, 1985 by H. Frehler et al provided an apparatus for carrying out a process for the continuous production of chlorine dioxide. The system included a cascade reactor having means for the introduction of air. Means were provided for providing a reduced pressure within the reactor. Means were provided for separating chlorine gas separated off from the reaction product and for reaction of such gas with cathodically-formed hydrogen, along with the introduction of external chlorine gas, to give the required amount of hydrochloric acid. The apparatus included at least one chlorate electrolysis plant, a cascade reactor, a separation column and a hydrochloric acid synthesis furnace, which were connected with one another. A valve was provided in the air inlet pipe of the reactor, which was regulated corresponding to the pressure at the product outlet of the reactor. The problem of the diluent gas, as discussed previously remains.

U.S. Pat. No. 4,938,944 patented Jul. 3, 1990 by R. Divorak provided a reactor for the production of a gaseous mixture containing chlorine dioxide and chlorine, by reacting alkali metal chlorate in an aqueous solution of hydrochloric acid. The reactor included a plurality of superimposed reaction levels which were traversed by the solution from top to bottom. In the lower portion of the reactor, the solution in which chlorate and acid had been depleted was reboiled in a reboiling chamber by an indirect heating at a temperature in the range of from about 100° to about 110° C. The depleted solution was conducted from the reboiling chamber to a pressure chamber, in which a pressure of at least 1.2 bar was maintained. In the pressure chamber, the solution was reboiled at temperatures from about 110° to about 150° C. and the vapours formed by the reboiling in the pressure chamber were conducted through the reboiling chamber for an indirect heating therein. This design used the technique of increasing the temperature of the acidified brine to achieve high efficiency while attempting to assure substantially complete conversion of the hydrogen chloride. However, the provision of pressure chambers brings about problems of costly reactor construction.

SUMMARY OF THE INVENTION (i) Aims of the Invention

As discussed above, there are thus many patents directed to integrated chlorine dioxide plants generally, and to chlorine dioxide generators specifically. The patents have attempted to achieve three main goals for the design of the chlorine dioxide generator. One goal was to minimize the waste reaction which produces only chlorine from sodium chlorate. Another goal was to deplete the residual hydrogen chloride left in the reaction mixture. The remaining goal was to minimize the installed capital cost of the generator system.

As discussed hereinabove, in years past, several inventors have developed chlorine dioxide generator designs for accomplishing one or more of these goals. However, all such goals have not heretofore been achieved in the same chlorine dioxide generator design. In spite of the above-identified patented improvements in the integrated chlorine dioxide production process, there is still a need for a process which provides for improved economics in manufacture of the chlorine dioxide.

The chlorine dioxide generators known in the art generally suffered from the drawbacks of being complicated in design and cumbersome and costly to operate, or of being relatively inefficient in operation. On the other hand, while a known chlorine dioxide generator might be relatively simple in design and efficient in operation, it may not be adaptable to an integrated plant design.

An object of the present invention is the provision of a dual chlorine dioxide generator system which is simple in design and efficient in operation.

Still another object of this invention is to provide a dual chlorine dioxide generator system which takes advantage of the use of a temperature gradient as a valid technique for improving efficiency while insuring acid depletion.

Yet another object of this invention is to provide a dual chlorine dioxide generator in the form of specification designs of a primary and a secondary generator.

Yet another object of this invention is the provision of a process for preparing chlorine dioxide in which the reactants are provided efficiently by an electrolytic chlorate cell, and in particular in which the off-gases from the electrolytic chlorate cell are used as a source of hydrogen gas for the reaction to form reactant hydrochloric acid in a dual chlorine dioxide generator system.

Still another object of the present invention is the provision of a continuous recyclic process for the production of chlorine dioxide in which a minimum of raw materials is necessary to maintain the operation thereof.

Still another object of the present invention is the provision of a continuous recyclic process for the production of chlorine dioxide which is simple and safe in operation and easily controlled.

(ii) Statements of Invention

The present invention uses a new approach to generating chlorine dioxide. This approach is the use of two vessel system in which the first vessel is operated to create substantially isothermal conditions and in which the second vessel is operated to generate a continuous decreasing temperature gradient from bottom to top thereof.

Thus, the present invention provides in combination, a dual generator, chlorine dioxide generating system comprising: (I) a first generator for carrying out an incomplete isothermal reaction between reactants comprising an alkali metal chlorate/alkali metal chloride solution and a reducing agent at a first elevated temperature which is low enough to favor a chemical reaction for the production of chlorine dioxide, such first generator comprising a generally-cylindrical, upright vessel, an upper radial inlet for the entry of reactants, such radial inlet entering the generally-cylindrical, upright vessel at a vertical location to provide both a lower liquid volume and an upper vapor space, an upper axial outlet for the withdrawal of gaseous products of reaction, a lower radial outlet for the withdrawal of a mixture of partially-reacted reactants and reaction products, a lower axial outlet for the withdrawal of a mixture or partially-reacted reactants and reaction productivity, and a heat exchanger loop connected between the lower axial outlet and the upper radial inlet, such heat exchanger loop including a pump for the re-circulation of such withdrawn mixture of partially-reacted reactants and reaction products, an injection port for the injection of such fresh reactants, an indirect heat exchanger, a conduit connected to the outlet from the pump, such conduit passing through the indirect heat exchanger, a reducing agent inlet to the heat exchanger loop for the injection of a solution of such reducing agent, and a conduit connecting the heat exchanger loop to the upper radial inlet; (II) an interconnected second generator for completing said incomplete isothermal reaction under a natural temperature gradient where downwardly-flowing reactants are heated from the first temperature to a temperature higher than the first temperature, thereby to complete the production of chlorine dioxide, such interconnected second generator comprising a generally-cylindrical, upright vessel, a radial inlet port for the introduction thereinto of the liquid mixture of partially-reacted reactants and reaction products withdrawn from the first generator, the radial inlet port entering the cylindrical vessel at a vertical location to provide both a lower liquid volume and an upper vapor mixture space, an upper axial outlet port for the withdrawal of gaseous reaction products including chlorine dioxide, a plurality of spaced-apart, transverse, perforated baffles disposed within the lower portion of the generally-cylindrical upright vessel, a lower indirect heat exchanger for the heating of downwardly flowing such introduced mixture of partially-reacted reactants and reaction products, thereby to provide a countercurrent flow of upwardly-rising gaseous reaction products, and a lower, radial, outlet port for the withdrawal of reacted alkali metal chlorate/alkali metal chloride solution; and (III) an interconnecting conduit interconnected between the lower radial outlet means from the first generator, for the withdrawal of a mixture of partially-reacted reactants and reaction products, and the radial inlet port to the second generator, for the introduction of the liquid mixture of partially-reacted reactants and reaction products withdrawn from the first generator.

(iii) Other Features of the Invention

By one feature of this invention, the first generator has a generally-cylindrical upright vessel which is formed of titanium.

By another feature of this invention, the primary upper portion of the generally-cylindrical upright vessel constituting the first generator is formed of titanium, and a lower portion of the generally-cylindrical upright vessel formed of fluoro-polymer-lined steel.

By still another feature of this invention, the injection port for the injection of fresh reactants into the heat exchanger loop is upstream of the indirect heat exchanger.

By a still further feature of this invention, the reducing agent inlet means into the heat exchanger loop is downstream of the indirect heat exchanger.

By yet another feature of this invention, the first generator includes an explosion-proof cover adjacent the upper axial gas outlet means.

By a feature of this invention, the second generator includes a double-open-ended frusto-conical interconnecting vessel which is integrally connected to a lower end of the upper cylindrical vessel, and a lower cylindrical vessel which is integrally connected at its upper end to a lower open-end of the frusto-conical interconnecting vessel, and the lower cylindrical vessel, i.e., so that the lower cylindrical vessel is of less diameter than the upper cylindrical vessel.

By another feature of this invention, the second generator includes: a partially-cylindrical, upright, longitudinally-disposed axial baffle between the lower indirect heat exchanger and the lower radial outlet port.

By yet another feature of this invention, the generally-cylindrical upright vessel which constitutes the second generator is formed of titanium.

By still another feature of this invention, the indirect heat exchanger within the second generator is a tube bundle.

By a still further feature of this invention, the generally-cylindrical, upright vessel constituting the second generator includes an explosion-proof cover adjacent the upper axial gas outlet means.

(iv) Generalized Description of the Invention

This invention provides a design for a chlorine dioxide generation system. This generator system is designed to complete the reaction of sodium chlorate and hydrogen chloride in water solution so that the hydrogen chloride is substantially depleted from the solution. In this system, sodium chlorate is efficiently converted to chlorine dioxide. A water balance is maintained for an integrated chlorine dioxide plant.

The first vessel of the invention will hereafter be referred to as the "primary generator". The second generator of the invention will hereafter be referred to as the "secondary generator".

The following is a general description of the process of the present invention.

Sodium chlorate brine and hydrochloric acid are mixed in the primary generator. The primary generator is operated at a temperature that favours high reaction efficiency. The majority of the reaction between sodium chlorate and hydrogen chloride is completed in the primary generator. A vapour product containing chlorine dioxide, chlorine, and water vapour is produced in the primary generator. A brine solution that is partially depleted of sodium chlorate and hydrogen chloride is also produced in the primary generator. This partially depleted brine is withdrawn from the primary generator and is used to feed the secondary generator.

The partially depleted brine is introduced into the upper portion of the secondary generator. From there, the partially-depleted brine descends in a downward direction through a continuously-increasing temperature gradient. The temperature gradient is established by hydrostatic and phase equilibrium forces as steam rises in the secondary generator. By the time the brine reaches the bottom of the secondary generator, the reaction of sodium chlorate with hydrogen chloride is substantially complete. The chlorine dioxide and chlorine, that are generated by the reaction, are stripped from the descending brine by rising steam.

BRIEF DESCRIPTION OF THE DRAWINGS

In the accompanying drawings.

Figure 1:
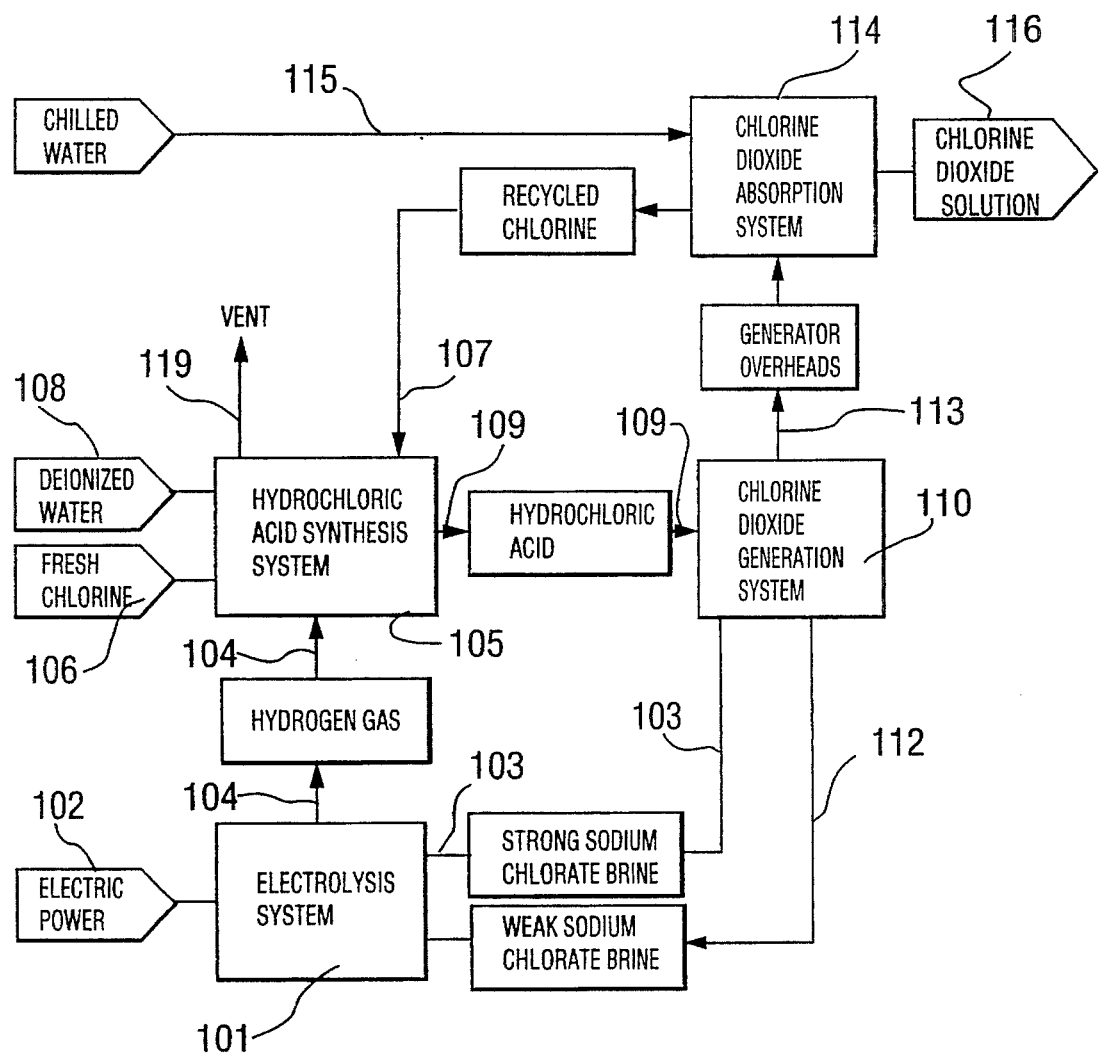
FIG. 1 is a block diagram of an integrated chlorine dioxide plant.

DESCRIPTION OF THE DRAWINGS (i) Description of FIG. 1

As seen in FIG. 1, an electrolysis system 101 is provided, which can be any of the conventional chlorate electrolysis cells, e.g., as disclosed in any of the following patents, the contents of which are incorporated herein by reference: (a) Canadian Patent No. 1,074,257 patented Mar. 25, 1980 by G. O. Westerlund; (b) U.S. Pat. No. 3,463,722 patented Aug. 26, 1969 by G. O. Westerlund; (c) U.S. Pat. No. 4,101,400 patented Jul. 18, 1978 by G. O. Westerlund; and (d) U.S. Pat. No. 5,225,061 patented Jul. 6, 1993 by G. O. Westerlund.

One brief description of such electrolytic cell is as follows: The electrolytic cell includes an electrolyzer, preferably constructed out of FRP with a liner of a fluorocarbon plastic, e.g., the polytetrafluoroethylene known by the trademark TEFLON™. The electrolyzer is integrated with a reactor vessel by means of an interconnected outlet line and refeed line. Atop the reactor vessel is a header/degasifier. A gas vent line leads from the header/degasifier. An internal, immersed heat exchanger is provided within the reactor vessel. The reactor vessel, the header/degasifier, and the piping are all preferably formed of titanium.

A lower outlet line leads via a pump to a main liquor outlet line. Main outlet line is connected via a steam line to a flash tank, and such line also branches to be connected to lower liquor inlet line. The flash tank includes a liquor return line. Within the flash tank is demister, the outlet of which leads to upper outlet line.

The upper-outlet line is connected via an absorber both to a connecting line and to a condensate receiver tank. Condensate receiver tank is connected, via pump, to acid scrubber.

In the electrolysis system, shown in FIG. 1, brine, e.g., sodium chloride, is electrolyzed in a bipolar electrolyte cell of the electrolysis system 101 by means of electric power 102. The liquor in brine outlet line 103 from the cell 101 is strong sodium chlorate brine. As used herein, the term "strong brine" means an aqueous mixture of sodium chlorate and sodium chloride in which the sodium chlorate concentration is highest and the sodium chloride concentration is lowest. The range for sodium chlorate concentration in strong brine is about 450 to about 600 grams/liter. The range for sodium chloride concentration in strong brine is about 90 to about 125 grams/liter. The gas in gas outlet line 104 from the cell 101 is principally hydrogen with some water vapour therein.

The gas in line 104 is fed to a hydrochloric acid synthesis system 105, e.g., as shown in U.S. patent application Ser. No. 07/843,945, the contents of which are incorporated herein by reference. Briefly, however, such hydrogen chloride synthesis reactor may be described as follows: The hydrogen chloride synthesis reactor may be constructed of steel lined with an acid-resistant fire brick. The hydrogen chloride synthesis reactor is capped with an inlet header, which is preferably in the form of a quartz tube. Connected to the inlet header is a top feed line protected by a fire arrester. A branch line leads to a top feed line. The hydrogen chloride synthesis reactor is provided with an upper chlorine feed line which also includes a make-up chlorine demand branch line, and with a pair of intermediate water quenching feed lines. A pilot gas feed line, and a high voltage wire, are each fitted to the inlet header.

The lower end of the hydrogen chloride synthesis reactor is provided with an outlet, connected to an absorber. The absorber is connected via a connecting line to the lower inlet of a hydrogen chloride scrubber. Such line is preferably formed of glass or of a fluorocarbon plastic, e.g., the polytetrafluoroethylene known by the trademark TEFLON™. The hydrogen chloride scrubber is preferably constructed of FRP (glass-fibre-reinforced plastic) with a fluorocarbon plastic liner, e.g., the polytetrafluoroethylene known by the trademark TEFLON™. An upper line leads to the upper region of the hydrogen chloride scrubber.

A bleed line is provided at the top of the hydrogen chloride scrubber, and a product effluent line leads to a receiving tank. Receiving tank is provided with an outlet line fitted with a flow control valve or metering pump.

As shown in FIG. 1, the hydrochloric acid synthesis system 105 includes a hydrogen chloride combustion chamber which is fed with make-up fresh chlorine gas via line 106 along with the hydrogen gas fed in through line 104. Additional chlorine gas is fed to the combustion chamber of the hydrochloric acid combustion system 105 via recycled chlorine line 107. Gaseous hydrogen chloride formed by this combustion reaction is dissolved in deionized water, which is fed in through water line 108, and hydrochloric acid of about 20% to about 40% by weight, HCl is withdrawn through hydrochloric acid line 109. Excess innocuous gases are vented from the scrubber of the hydrochloric acid synthesis system 105 via vent line 119.

Hydrochloric acid in hydrochloric acid line 109 and strong sodium chlorate brine (as above defined) in brine outlet line 103 are fed to a dual chlorine dioxide generation system 110 of the present invention which will be described in greater detail with respect to FIG. 2, FIG. 3 and FIG. 4 hereinafter. The liquid outlet line 112 from chlorine dioxide generation system 110 contains weak sodium chlorate brine. As used herein, the term "weak brine" means "an aqueous mixture of sodium chlorate and sodium chloride in which the sodium chlorate concentration is lowest and the sodium chloride concentration is highest. The range for sodium chlorate concentration is about 300 to about 450 grams/liter. The range for sodium chloride concentration in weak brine is about 150 to 200 grams/liter.". Such weak brine is fed back to the electrolysis system 101. The generator overheads in gaseous outlet line 113 pass to a chlorine dioxide absorption system 114.

Such system 114 may be any such system, e.g., that disclosed in the above-identified U.S. patent application Ser. No. 07/843,945, the contents of which are incorporated herein by reference. Such absorption systems disclosed therein may be described as follows: In one alternative embodiment of a chlorine separation and chlorine dioxide absorption system where a small amount of air is used for stripping, the gas outlet line from the chlorine dioxide generator is connected to the lower chamber of an absorber column. The absorber column includes a bottom section, a lower section and an upper section. The bottom section of the absorber column is connected, via a connecting line to a barometric leg liquid column. The barometric leg liquid column includes a liquid product outlet, which is discharged by a pump to the previously described storage feed line, which, in turn, is connected to an insulated storage tank. An air stripping inlet line, or a compressed air feed line is connected to the barometric leg liquid column. The stripped gases outlet line is connected to an elevated, but mid-point, of the absorber column.

The absorber column is also provided with a chilled water inlet. A demister may be provided in the upper portion of the absorber column. The absorber column is also provided with a tail gas discharge line. The tail gas discharge line is connected to the inlet side of a compressor, and the compressor is provided with a compressed gas outlet line.

In a second alternative embodiment of a chlorine separation and chlorine dioxide absorption system where weak acid absorption is used along with subsequent desorption by an air stream, the chlorine dioxide generator gases from chlorine dioxide generator are fed to the mid lower section of a chlorine gas separating tower, which is packed with solid packing material, which promotes liquid-gas contact. Such tower is provided with a tail gas outlet line, which leads to a chlorine compressor. The tower is also provided with a liquid outlet line which leads to a receiver/stripper. The liquid outlet line is provided with a reductant injection port for a chlorine reducing agent, e.g., hydrogen peroxide. A weak acid feed line leads from the refrigeration or chiller system to the upper portion of the tower.

The absorber tower bottoms, which are chlorine dioxide dissolved in weak acid are heated by a heat exchanger and then sent to the top of a receiver stripper. The receiver/stripper is provided with a recycle acid outlet line leading to a recycle acid liquid pump. The pump is connected via line to a refrigeration/chiller system. The receiver/stripper is also provided with a stripped gases outlet line. Air is introduced into the bottom of the receiver/stripper to strip chlorine dioxide from the weak acid.

In the chlorine dioxide absorption system, shown in FIG. 1, chilled water, which is fed in through water line 115 preferentially dissolves the chlorine dioxide to provide a chlorine dioxide solution in chlorine dioxide outlet line 116. The undissolved chlorine is removed through recycled chlorine line 107 to the hydrogen chloride combustion chamber of the hydrochloric acid combustion system 105.

Figure 2:
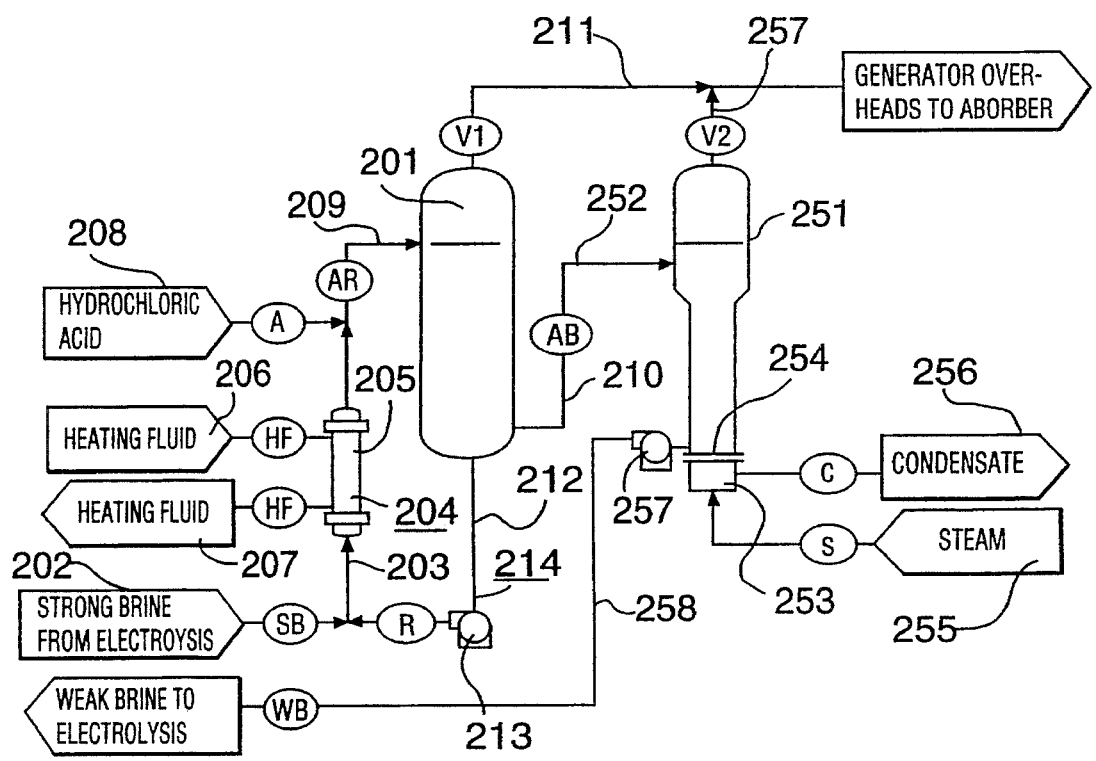
FIG. 2 is a process flow chart for a dual-generator system of the present invention for the production of chlorine dioxide.

(ii) Description of FIG. 2

FIG. 2 shows the interconnected dual chlorine dioxide generator system of the present invention, i.e., the interconnected primary generator 201 and the secondary generator 251. Strong brine, (as defined above), i.e., a solution of sodium chlorate and sodium chloride, from the integrated plant electrolysis cell is fed via brine inlet line 202 through line 203 to a heater 204. Heater 204 is a heat exchanger 205 having heating a fluid inlet line 206 and a heating fluid outlet line 207. The heating fluid may be either low pressure steam, hot water, or hot sodium chlorate brine. By means of this heat exchanger, the temperature of the strong brine is raised to about 3° to about 5° F. Hydrochloric acid is mixed with the generator recirculation stream before it is re-introduced into the primary generator in the following manner. Hot, strong brine exiting heater 204 at a temperature between about 120° F. and about 150° F. is mixed with hydrochloric acid, containing about 20% to about 40 weight % hydrogen chloride from the hydrochloric acid synthesis system via hydrochloric acid inlet line 208 to provide acidified generator recirculation liquor. The acidified generator recirculation liquor is fed to the primary generator via primary inlet line 209. The concentration of the acidified generator recirculation liquor is from about 240 to about 510 g/L $NaClO_3$, from about 110 to about 200 g/L NaCl, and from about 18 to about 28 g/L HCl. It is preferred to have 340 g/L $Nacl_3$, 150 g/L NaCl and 25 g/L HCl.

The gases formed in the primary generator 201 exit through primary gas exit line 211 to be fed via generator overhead to an absorber (see 114 in FIG. 1). Such generator overhead comprises overhead vapour from the primary generator, i.e., a mixture of chlorine dioxide, chlorine, and water vapour. The general concentration thereof is $ClO_2$: about 10 to about 35%; $Cl_2$: about 9 to about 26%; and water vapour: about 40 to about 80%. It is preferred to have 24% $ClO_2$, 18% $Cl_2$, and 53% water.

The unreacted or partially reacted liquor is withdrawn from the primary generator 201 via line 212 by recirculation pump 213.

Such withdrawn primary generator contents, i.e., generator recirculation, are pumped by pump 213 through a heat exchanger loop 214 including previously described lines 203 and 209, to maintain the temperature in the primary generator 201 at about 120° F. to about 150° F. As previously described, this recirculated liquor is mixed with strong brine in line 202 to form inlet brine mixture in line 203. Such brine from the primary generator 201 is fed to secondary generator 251 via line 252 and passes downwardly therein. A secondary boiler 253 at the bottom 254 of the secondary generator 251 is heated via steam entering through steam inlet 255 and condensate so formed exits via condensate line 256.

The main gaseous reaction products are withdrawn via gas outlet line 257 to be mixed with the generator overhead from the primary generator 201 to be fed to the absorber 114 (FIG. 1). The overhead vapour from the secondary generator, is a mixture of chlorine dioxide, chlorine, land water vapour, of the following general concentration: $ClO_2$: about 2 to about 12%; $Cl_2$: about 3 to about 10%; and water vapour: about 70 to about 96%.

The unreacted liquor from secondary generator 251 is withdrawn via recirculation pump 257 and through outlet line 258 as weak brine. This weak brine contains more sodium chloride, more water, and less sodium chlorate than the strong brine., i.e., it has the following concentration: $NaClO_3$: about 29 to about 38%: and NaCl: about 10 to about 16%. This weak brine steam is sent to the electrolysis system 101 of the integrated chlorine dioxide plant.

Figure 3:
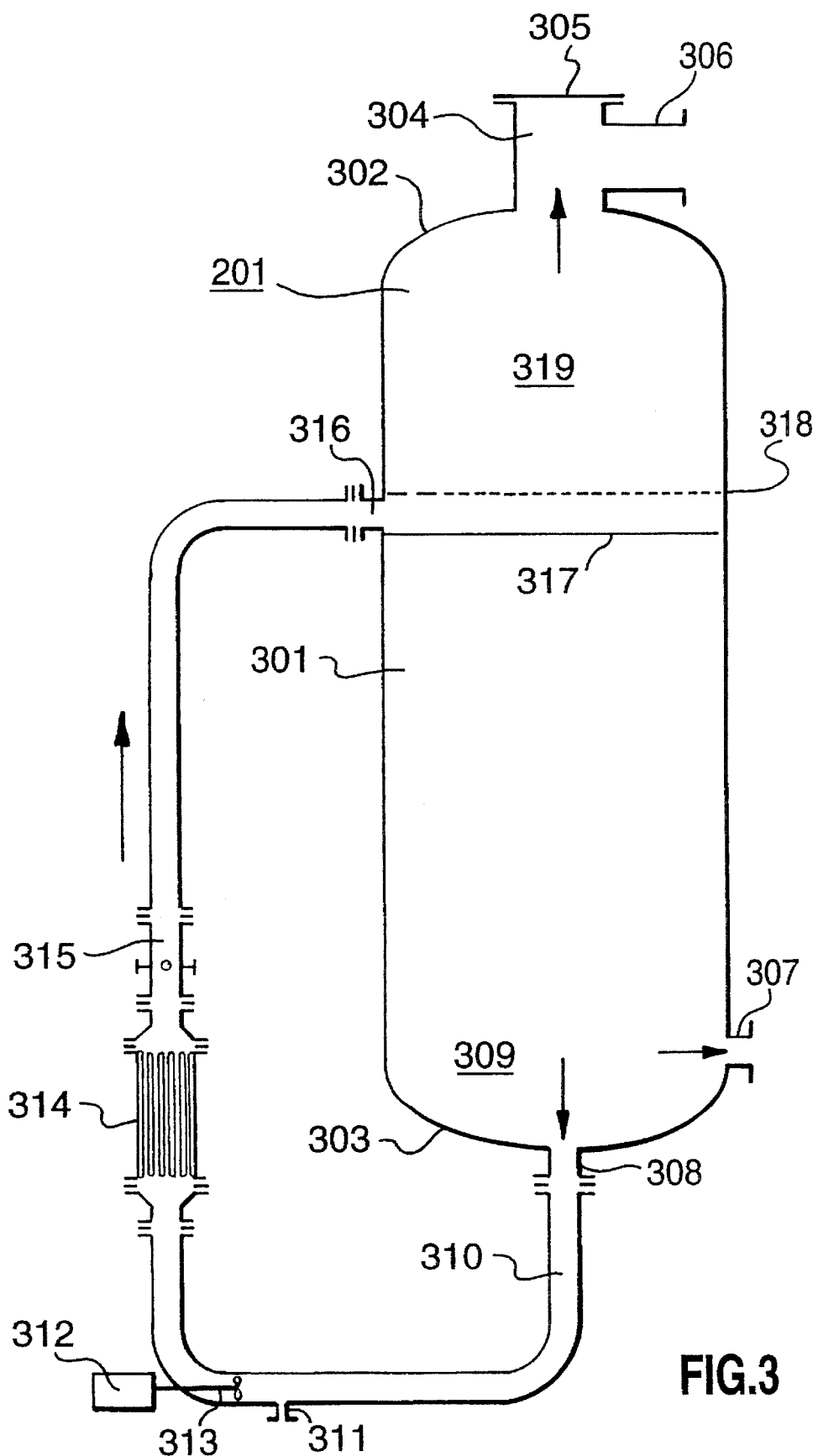
FIG. 3 is a central, longitudinal cross-section of one design of a primary chlorine dioxide generator of the present invention.

(iii) Description of FIG. 3

FIG. 3 shows the primary generator 201. This is a generally cylindrical vessel 301 having a domed top 302 and a domed bottom 303. Domed top 302 includes an axial outlet conduit 304 having an explosion-relief cover 305 and radial product vapour outlet conduit 306.

A radial liquid product outlet port 307 is provided near the bottom 303 of the cylindrical vessel 301.

A recycle axial outlet port 308 at the base 309 of the domed bottom 303 is connected to a recycle conduit 310. Recycle conduit 310 includes a radial strong brine inlet port 311 connected to a strong brine inlet line 202 (see FIG. 2). A recirculation pump drive 312 having an impeller 313 is also provided within recycle conduit 310.

Recycle conduit 310 leads to heat exchanger 314 [i.e., that referred to a heat exchanger 205, in FIG. 2] and a hydrochloric acid injection spool 315 [i.e., that referred to a hydrochloric acid inlet line 208, in FIG. 2]. Finally, recycle conduit 310 connects to radial acidified inlet port 316, at approximately three-quarters of the height of the cylindrical vessel 301. This provides a free liquid surface shown as solid line 317, although such surface may be slightly higher as shown as the broken line 318. The space above the free surface in the cylindrical vessel 301 is a vapour space 319.

Figure 4:
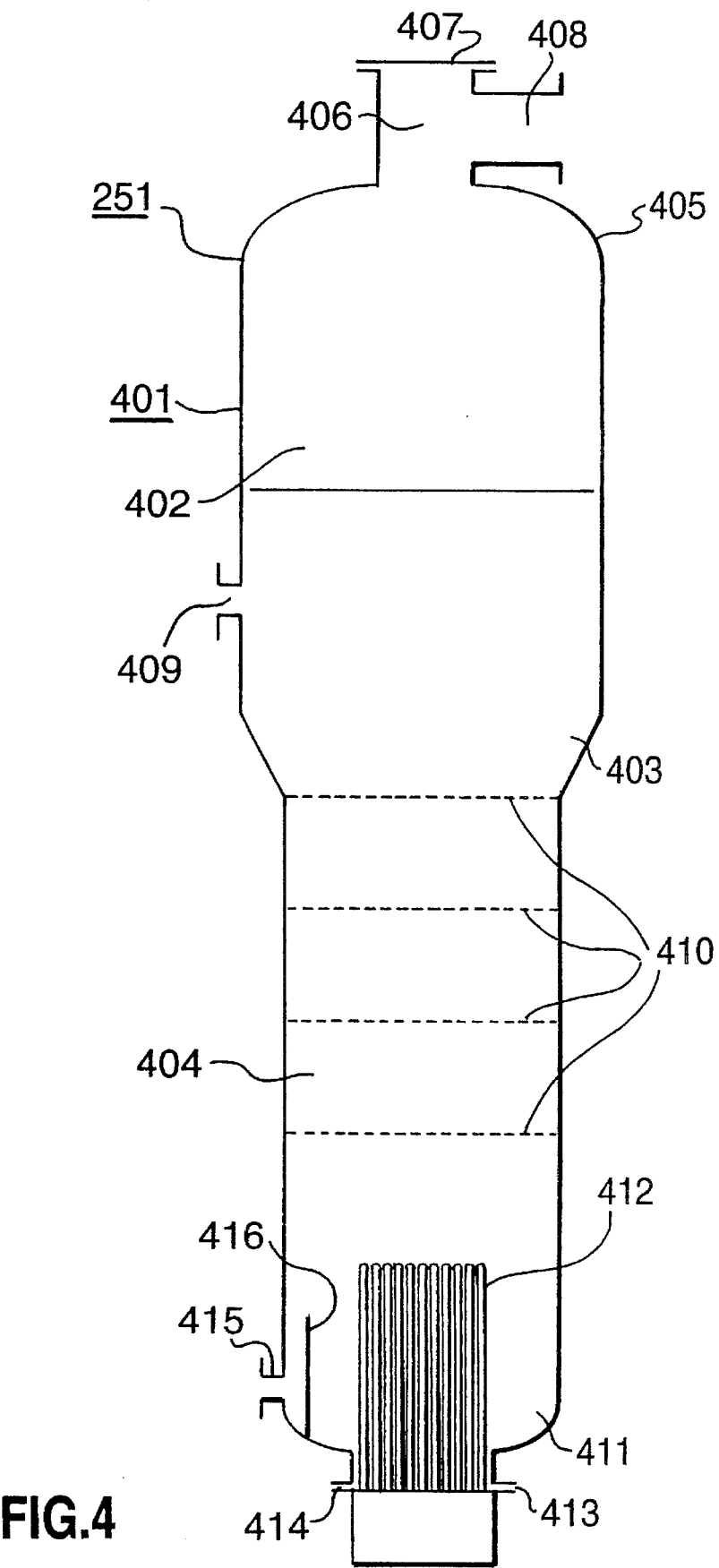
FIG. 4 is a central, longitudinal cross-section of one design of a secondary chlorine dioxide generator of the present invention.

(iv) Description of FIG. 4

The secondary generator 251 shown in FIG. 4 is a cylindrical vessel 401 having an upper cylindrical portion 402, a mid-frusto conical portion 403 and a bottom smaller diameter cylindrical portion 404. Upper cylindrical portion 402 has a domed top 405 and an axial outlet port 406 provided with an explosion-proof cover 407. Outlet port 406 leads to product vapour outlet conduit 408.

Upper cylindrical portion 402 also includes a radial inlet port 409 connected to the radial liquid product outlet port 307 of the primary generator 201. Radial inlet port 409 is for the introduction of acidified brine from the primary generator 201.

Lower cylindrical portion 404 of vessel 401 is provided with a plurality (in this case four) transverse perforated baffles 410, to prevent short circuiting of downward liquid flow.

At the domed base 411 of the lower portion 404 is an axial heat exchanger tube bundle 412, provided with a steam inlet port 413 and a condensate outlet port 414.

Near the base 411 is a radial outlet port 415 to be connected to line 258, to draw off the hot depleted brine. A partial cylindrical longitudinal baffle 416 is disposed between the tube bundle 412 and the outlet port 415.

DESCRIPTION OF OPERATION OF THE INVENTION (i) Description of Operation of FIG. 1

The operation of the integrated chlorine dioxide plant as shown in FIG. 1 may be described as follows:

The operation of the embodiment shown in FIG. 1 includes operation as a chlorate electrolysis zone; as a chlorine dioxide production zone; and as a chlorine dioxide separation zone.

The electrolysis procedure in the electrolyzer comprises partly oxidizing original brine make-up originally provided and recycled chlorides in recycled chlorate solution provided in line 112 to chlorate, which is removed through line 103. Hydrogen gas and water vapour removed via line 104 are fed to the hydrochloric acid synthesis zone 105.

Hydrochloric acid is synthesized by the combustion of chlorine make-up provided in line 106 coupled with recycled chlorine provided in line 107 with hydrogen gas provided in line 104. The hydrogen chloride product is scrubbed with deionized water provided in line 108 to produce hydrochloric acid which is passed as feed through line 109 to the chlorine dioxide generator 110 of the present invention. The hydrochloric acid synthesis zone 105 include a flash evaporator zone (not shown) to recover water vapour.

Chlorine dioxide is generated in the dual chlorine dioxide synthesis generator 110 of the present invention by reduction of chlorate employing hydrochloric acid fed as the reducing agent. Chlorine is a by-product in this reaction and the main part of this chlorine is recycled via line 107 to the hydrogen chloride synthesis reactor 105. Chlorine dioxide gas produced in chlorine dioxide synthesis generator is separated in the separation zone 114, i.e., by being dissolved in chilled water in line 115 to provide an aqueous solution of chlorine dioxide as the finished product, removed via line 116.

The chlorate electrolytic system may be any conventional electrolyzer system.

The dual chlorine dioxide generator is the novel dual chlorine dioxide generator of the present invention referred to hereinabove.

In the operation of the hydrogen chloride synthesis system, the process proceeds as follows:

The combustion chamber is fed with hydrogen cell gas feed through line 104, which may be protected against flashback by the use of the fire arrester (not shown). Water may be injected to the hydrogen gas stream through a line (not shown) to lower the combustion temperature to approximately 1,500° C. For start-up, compressed air is fed into the header by means of a pilot line (not shown). Recycle chlorine in line 107 is continuously fed to the hydrogen chloride synthesis reactor when the temperature in the hydrogen chloride synthesis reactor, i.e., combustion chamber is above about 600° C., along with make-up chlorine added through a branch line 106 on demand, controlled by way of an acid level controller fitted to a hydrochloric acid receiver tank (not shown). A high voltage wire provide sparks for ignition of the gases. Deionized water is injected to the hydrogen chloride synthesis reactor 105, i.e., the combustion chamber, to lower the temperature at the lower section of the hydrogen chloride synthesis reactor, i.e., the combustion chamber. Such temperature at the outlet to the absorber should be maintained below about 300° C. to prevent failure of the absorber. Gases and condensate are discharged to the inlet of a hydrogen chloride scrubber (not shown). Scrubbing is effected using, deionized water. The hydrochloric acid is discharged by outlet line 109.

The chlorate electrolyzer of the electrolytic cell is integrated with the reactor vessel, with an interconnecting piping system, i.e., an outlet line, and re-entry line.

(ii) Operation of the Embodiments of FIGS. 2, 3 and 4

The combination of a substantially isothermal generator with a continuous temperature gradient vessel for generating chlorine dioxide is not suggested in the prior art. A continuous temperature gradient vessel for generating chlorine dioxide is also not suggested in the prior art.

The separation of functions provided by this arrangement allows for efficient chlorine dioxide production while simultaneously providing adequate hydrogen chloride depletion and excess water evaporation.

The primary generator 201 is the first of two generators in the dual generator system that produces chlorine dioxide from sodium chlorate brine and hydrochloric acid. The design of the primary generator 201 allows it, under proper operating conditions, to perform these functions: mix strong brine and hydrochloric acid; and react sodium chlorate with hydrogen chloride under conditions that maximize efficient conversion of sodium chloride to chlorine dioxide.

The primary generator 201 is a pressure vessel which is constructed of titanium or of fluoropolymer-lined steel and titanium. The liquor within the primary generator is recirculated through an external circulation pump and an external heat exchanger. The strong brine feed and the hydrochloric acid feed are both injected into the recirculation loop. The primary generator is designed for operation at reduced pressure, about 200 mmHg absolute or less.

The secondary generator 251 is the second of two generators in a dual generator system. The design of the secondary generator allows it, under proper operating conditions, to perform these functions: generate chlorine dioxide from the residual hydrogen chloride remaining in the acidified sodium chlorate brine from the primary reactor; deplete the hydrogen chloride content of the sodium chlorate brine to a low enough concentration that the resulting brine may be safely and efficiently regenerated by electrolysis; vaporize excess water vapour so that a water balance can be maintained in an integrated chlorine dioxide plant; and strip dissolved chlorine dioxide from the weak brine so that essentially all of the chlorine dioxide production goes out in the over-head vapour product.

The secondary chlorine dioxide generator is a pressure vessel which is constructed of titanium. The secondary generator is designed for operation at reduced internal pressure, about 200 mmHg or less. The upper end of the vessel is designed to achieve vapour-liquid disengagement. The overall length of the vessel is designed to achieve sufficient hydrostatic pressure at the vessel bottom. A tube bundle is inserted at the bottom of the vessel.

In operation of the dual chlorine dioxide generator system of this invention, the primary generator is fed with strong brine. Strong brine is injected into the recirculation loop, upstream of the recirculation heat exchanger. The primary generator is also fed with hydrochloric acid. Hydrochloric acid is injected into the recirculation loop downstream of the recirculation heat exchanger. Both of these feeds mix with brine from the generator as it flows through the recirculation loop. Good mixing is achieved by turning over the generator contents several times per hour. Chlorine dioxide and chlorine are generated in the primary generator as sodium chlorate and hydrogen chloride are consumed. Most of the chlorine dioxide and chlorine that are generated in the primary generator, leave the generator in the overhead vapour stream. The overhead vapour is kept at a low pressure, less than about 200 mmHg, to prevent spontaneous decomposition of the chlorine dioxide. At this low pressure, the overhead vapour contains a significant amount of water vapour.

The evaporation of water and the chemical reactions are endothermic processes. The temperature in the primary reactor is maintained with the recirculation heat exchanger.

Proper operating conditions for the primary generator 201 include: operating the primary generator 201 under a vacuum, so that the absolute pressure near the free surface is below about 200 mmHg and operating the primary generator at a temperature below about 150° F. and above about 110° F. The preferred operating temperature for the primary generator is from about 120° F. to about 130° F.; the turn over rate is from about 5 to about 50 generator volumes per hour. The molar ratio of sodium chlorate to hydrogen chloride in the primary generator feeds is from about 1 to about 5 moles/mole.

The secondary generator 251 is fed near the free surface with acidified chlorate brine from the primary generator. This brine descends toward the bottom of the secondary generator 251 and is removed. At the bottom of the secondary generator 251, a heat exchanger boils the brine, thereby creating steam bubbles. The steam bubbles rise through the brine which is flowing downward in a counter current flow. As the steam rises through the brine, the brine is heated by the steam bubbles. Under proper conditions, a continuous temperature gradient is formed with the brine temperature at the bottom of the secondary generator 251 being above about 200° F., and the temperature of the free surface of the brine being below about 170° F. Proper operating conditions for the secondary generator 251 includes: operating the secondary generator under a vacuum, so that the absolute pressure near the free surface is the same as near the free surface in the primary generator 201, i.e., below about 200 mmHg; and operating the secondary generator 251 with enough liquid fill, so that the hydrostatic pressure will increase the boiling temperature of the brine to about 200° F. or greater. Hydrostatic pressure increases by 0.52 to 0.60 pounds per square inch for every foot of depth below the free surface in the secondary generator. The rate at which hydrostatic pressure increases in the secondary generator 251 depends on the liquid density and the vapour volume in the liquid. Enough heat load is applied to the bottom heat exchanger to cause the excess water to vaporize and vent with the vapour product so that a water balance is maintained.

As the acidified sodium chlorate brine travels from the free surface of the secondary generator 251 to the bottom, the brine is gradually heated. The product selectivity for chlorine dioxide is better at lower temperatures, but as the hydrogen chloride is depleted, the rate of reaction slows. By allowing the reaction to continue at progressively higher temperatures, most of the reaction is completed at the lower temperatures at high selectivity. Then the higher temperatures increase the reaction rate to reduce the hydrogen chloride residual.

In the preferred embodiment, the primary generator 201 is fed with strong brine and hydrochloric acid, which are injected into the recirculation loop of the primary generator. The primary generator 201 is operated at a low temperature to achieve efficient conversion of sodium chlorate to chlorine dioxide. The primary generator 201 is recirculated at a rate that is fast enough to achieve good mixing.

The secondary generator 201 receives feed from a primary generator. The primary generator 201 should be operated at a lower free surface temperature than the secondary generator 251 to enhance overall efficiency. As a consequence, the feed from the primary generator 201 will contain 10 to 25 percent of the hydrogen chloride that was fed to the primary generator. The feed from the primary generator 201 should be introduced to the secondary generator 251 near the free surface.

The secondary generator 251 should have internal flow baffles. These baffles should be designed to restrict liquid flow only enough so that liquid flow in the generator does not bypass (losing effective residence time).

In preferred embodiments of this invention, the operating conditions for the primary generator 201 are as follows:

| | |
|---|---|
| Vapour space pressure | Less than about 200 mmHg absolute, preferably about 130 to about 180 mmHg |
| Temperature | about 110° F. to about 150° F., preferably about 120° F. to about 140° F. |

In preferred embodiments of this invention the operating conditions for the secondary generator 251 are as follows:

| | |
|---|---|
| Vapour space pressure | Same as primary generator |
| Free surface temperature | Less than about 170° F., preferably about 160° F. to about 165° F. |
| Bottoms temperature | More than about 200° F., preferably about 215° F. to about 225° F. |
| Materials of construction: | |
| Primary generator body | All Titanium or a titanium top with a fluoropolymer-lined steel bottom |
| Recirculation heat exchanger | Titanium |
| Recirculation loop piping | Titanium or fluoropolymer-lined steel |
| Hydrochloric acid nozzles | Titanium or fluoropolymer |
| Secondary generator body | Titanium |
| Boiler tubes | Titanium |
| Gaskets | Fluoropolymers |
| Internals | Titanium |

(iii) Operation of System for Separation of Chlorine Dioxide from Chlorine

In the operation of the embodiment which is used as the chlorine separation and chlorine dioxide absorption system where a small amount of air is used for stripping, the effluent from the gas zone of the chlorine dioxide generator is led by pipe line to the inlet of the absorber system. The effluent feed via line enters the bottom of the absorber column with the lower section disposed below the entry of stripped gases via line from barometric leg liquid column. The gases in the absorber are thus intermixed with the stripped gases from line, derived from barometric leg liquid column. The purpose of this mixing is to lower the chlorine content in the chlorine dioxide product solution.

The gases in both the upper zone and the lower zone of the absorber are scrubbed by counter current flow with downwardly flowing chill water admitted via line. A typical absorber should recover 99+% of the chlorine dioxide. The vertical height of the absorber should be calculated to provide for this recovery. The demister minimizes carryover of chlorine dioxide solution into the chlorine compressor by the above described tail gas line.

The product containing near saturated chlorine dioxide water solution passes via line to pump where it is pumped via the above described line to an insulated storage tank.

In the operation of the embodiment which is used as the chlorine separation and chlorine dioxide absorption system where acid absorption is used along with subsequent desorption by an air strip, the effluent gases, i.e., chlorine dioxide and chlorine produced in the chlorine dioxide generator are fed via the above-described line to the separating tower. the separating tower is filled with conventional packing, i.e., BURL™ saddles or RASCHIG™ rings. The chlorine dioxide acidic absorbing liquid, i.e., hydrochloride acid, is about 3 to about 30 g/L HCl at a temperature preferably of about 36° F.

The acidic liquid containing absorbed chlorine dioxide, typically about 12 to about 14 g/L ClO$_2$ and is forwarded to its final use.

EXAMPLES

Pilot Dual Generator System

The invention was tested on a pilot scale. The pilot version of the primary generator was built of jacketed glass sections. The inside diameter of primary generator was 3 inches. The overall length of the primary generator was 34 feet. Half inch diameter teflon tubing was used for the primary generator's recirculation loop. The primary generator was heated with hot water which was circulated through the heating jackets. Half inch teflon tubing was used to connect the bottom of the primary generator to the upper-section of the secondary generator.

The secondary generator was built of fluoropolymer-lined steel. The inside diameter of the lower half of the secondary generator was 1.75 inches. The inside diameter of the top half of the secondary generator was 2.75 inches. The overall length of the secondary generator was 25 feet. The secondary generator was heated with a titanium bayonet tube. The bayonet tube was four feet long and one inch in outside diameter. Steam was used to heat the bayonet tube.

The generator overheads were connected by a header made of polyvinylchloride pipe to an absorber. The absorber contacted the generator overheads with water to absorb substantially all of the chlorine and chlorine dioxide. A vacuum pump was connected to the top of the absorber. A small amount of air was bled into the top of the primary generator to establish pressure control.

For the sake of safety, the primary generator was equipped with a pressure relief device which was installed on the top of the primary generator. This was done because stagnant chlorine dioxide vapour has a tendency to decompose spontaneously, particularly at higher concentrations and temperatures. During normal operation, these spontaneous decompositions did not occur.

The pilot generator system was enclosed in red (red light transmitting) PLEXIGLASS™. PLEXIGLASS™ was used for personnel protection and allowed visual observation of the primary generator. Red transmission plexiglass was chosen to prevent the blue/violet and ultraviolet components in ambient light from decomposing the chlorine dioxide as it was generated.

The results are tabulated in Table I hereinbelow.

The data in Table I shows the composition of the hydrochloric acid and strong brine streams as these are introduced into the pilot primary generator's recirculation loop. These are listed under the heading "Operating Conditions". These streams were combined as they entered the top of the pilot generator to form the combined feed liquid. The composition and rate of this feed is shown in Table I under the heading "Combined Liquid Feeds".

Table I also shows an analysis of the hydrogen chloride depleted brine leaving the secondary generator under the heading "Flows and Concentrations Out". HCl recovery is the concentration of hydrogen chloride left in the depleted brine.

Other operating conditions are recorded under the "Operating Conditions" heading. Among these are primary generator temperature, the absolute pressure of the generator overheads, and the recirculation rate of the primary generator.

During experimental runs, the product liquid from both reactors would be sampled and analyzed for hydrogen chloride content. The hydrogen chloride content of each stream is recorded in grams per liter under the heading "HCl Recoveries". The analytical results were also used to calculate the kilograms of hydrogen chloride left in the secondary generator's liquid product for every metric ton of sodium chlorate consumed by the generator system. This number is also recorded under the heading "HCl Recoveries". This number is significant to the operation of an integrated plant's electrolysis section.

Efficiency was measured by gas chromatography. A gas chromatograph was connected to three sample connections with tubing. One connection sampled the overheads from the primary generator. Another connection sampled the overheads from the secondary generator. The last connection sampled the combined overheads just ahead of the absorber. A vacuum pump was used to draw samples through the gas chromatography. Efficiency was calculated by the following formula:

$$E(\%) = 600/(2r+5)$$

Where r is the molar ratio of chlorine to chlorine dioxide and E(%) is the percent efficiency. 100% efficiency corresponds to a ratio of ½ mole of chlorine generated per each mole of chlorine dioxide generated. The efficiency calculated by this method is the efficiency for sodium chlorate utilization (one mole of $ClO_2$ is generated for each mole of sodium chlorate consumed at 100% efficiency).

Efficiencies are also noted in Table I under the heading "Efficiencies". Hydrogen chloride conversions are also recorded under the heading, "Conversions".

There are four columns of data recorded in Table I. Each of these columns corresponds to an experiment that was performed with the pilot generator system. The first three columns are for experiments that were performed at different feed rates or primary generator temperatures. The feed rates and primary generator temperatures are recorded under the heading "Operating Conditions". The last column is for an experiment in which only the primary generator was operated, and the secondary generator was bypassed. The data in this column gives a view of performance of the primary generator alone.

TABLE I

| Operating Conditions | | | | | |
|---|---|---|---|---|---|
| 1 Temperature, avg, primary | F. | 140 | 140 | 121 | 149 |
| 2 Pressure, overhead, absolute | Torr | 222 | 224 | 222 | 217 |
| 3 Ratio, NaClO3/HCl in feed | mol/mol | 1.4 | 4.1 | 1.4 | 1.39 |
| 4 Rate Aq Acid Feed | lb/hr | 8.2 | 4.1 | 4.1 | 8.20 |
| 5 Rate recirulation flow | gpm | 1.1 | 1.0 | 1.0 | 2.8 |
| 6 Conc HCl in Acid | wt % | 34.7 | 34.7 | 35.2 | 35.2 |
| 7 Conc NaClO3 in Strong Brine | wt % | 39.3 | 39.3 | 40.1 | 39.8 |
| 8 Conc NaCl in Strong Brine | wt % | 6.62 | 6.62 | 6.49 | 6.2 |
| 9 Conc Sodium Dichromate in Aq Brine | wt % | 0.00 | 0.00 | 0.00 | 0.00 |
| 10 Level control. rel'tv to bttm of sec gen | ft | 16.6 | 16.8 | 16.8 | 16.8 |
| Feed Ratio, (total Cl⁻)/NaClO3) | mol/mol | 1.02 | 0.55 | 1.00 | 1.00 |
| Primary Liquid Level above Feed Nozzles | Ft | 4.5 | 0.5 | 2.3 | 0.0 |
| Pressure, bttm prim. generator, absolute | Torr | 756 | 770 | 762 | 733 |
| Temperatures, Secondary Reactor | | | | | |
| Top | F. | 130 | 130 | 114 | NA |
| Bottom | F. | 197 | 196 | 199 | NA |
| Combined Liquid Feeds (not incl recycle stream) | | | | | |
| Total Liquid Feedrate | lb/hr | 38.0 | 47.7 | 18.9 | 37.7 |
| HCl | wt % | 7.5% | 3.0% | 7.6% | 7.7% |
| NaClO3 | wt % | 30.8% | 35.9% | 31.4% | 31.1% |
| NaCl | wt % | 5.2% | 6.1% | 5.1% | 4.8% |
| Water | wt % | 56.5% | 55.1% | 55.9% | 56.4% |
| Estimated Specific Grav at 38 C. | [] | 1.28 | 1.34 | 1.29 | 1.28 |
| Liquid Residence Times (superfical) | | | | | |
| Primary, not including recycle | hr | 2.39 | 1.99 | 4.82 | 2.4 |
| Secondary | hr | 0.43 | 0.36 | 0.87 | NA |
| Flows and Concentrations Out | | | | | |
| Final Liquid Product | lb/hr | 36.0 | 47.4 | 18.8 | 32.1 |
| HCl | wt % | 0.258% | 0.192% | 0.211% | 0.786% |
| NaClO3 | wt % | 26.1% | 32.8% | 26.5% | 22.6% |
| NaCl | wt % | 11.0% | 8.6% | 10.2% | 11.3% |
| Water | wt % | 62.5% | 58.2% | 62.9% | 65.2% |
| Cl2 | wt % | 0.024% | 0.017% | 0.025% | 0.046% |
| ClO2 | wt % | 0.130% | 0.149% | 0.085% | 0.130% |
| HCl Recoveries | | | | | |
| Primary Product Liquid | gpl | 11.7 | 7.9 | 15.0 | 9.9 |
| Final Product Liquid | gpl | 3.3 | 2.6 | 2.7 | 9.9 |
| Final Product Liquid | kg/MT | 30 | 61 | 27 | 82 |
| Combined Overheads (wet) | | | | | |
| Cl2 (wet chemistry) | lb/hr | 1.75 | 0.92 | 0.91 | 1.94 |
| ClO2 (wet chemistry) | lb/hr | 1.60 | 0.78 | 0.70 | 1.98 |
| Efficiencies | | | | | |

TABLE I-continued

| | | | | | |
|---|---|---|---|---|---|
| Combined Overhead (GC) | % | 87% | 87% | 91% | 86.6% |
| Primary Overhead (GC) | % | 88% | 90% | 92% | 86.6% |
| Secondary Overhead (GC) | % | 80% | 81% | 63% | NA |
| Conversions | | | | | |
| HCl, overall | % | 97% | 94% | 97% | 91% |
| HCl, Primary reactor only | % | 88% | 80% | 85% | 91% |
| HCl, Secondary reactor only | % | 72% | 68% | 82% | |

A subsequent series of experiments was conducted with the secondary generator alone. For this series of experiments the same equipment was used except that the primary generator was converted into a new secondary generator and the old secondary generator was bypassed. For this conversion the recirculation loop was closed off. The heating bayonet tube from the old secondary generator was inserted into a new secondary generator. This arrangement allowed visual observation of the secondary generator. The new secondary generator also retained the pressure relief device that was mounted on the primary generator for the previous series of experiments.

The new pilot secondary generator was fed with chlorate brine and hydrochloric acid. The composition and flow rate of the feeds were controlled so that the feeds entering the pilot reactor would simulate feeds that were coming from a primary generator.

The results are tabulated below in Table II.

The data in Table II shows the composition of the acid and chlorate streams as these are introduced into the secondary under the heading "Operating Conditions". These streams were combined as they entered the top of the pilot generator to form the combined feed liquid. The composition and rate of this feed is shown in Table II under the heading, "Combined Liquid Feeds". Table II also shows an analysis of the hydrogen chloride depleted brine leaving the pilot generator under the heading, "Flows and Concentrations Out". HCl recovery is the concentration of hydrogen chloride left in the depleted brine.

Efficiencies and conversions were calculated by the same methods that were used for the previous series of experiments. These are recorded in Table II under the headings, "Efficiencies", and "Conversions".

TABLE II

| Operating Conditions | | | |
|---|---|---|---|
| 1 Temperature, bttm generator | F. | 208 | 223 |
| 2 Pressure, overhead, absolute | Torr | 135 | 197 |
| 3 Ratio, NaClO3/HCl in feed | mol/mol | 8.0 | 12.1 |
| 4 Role Aq Acid Feed | lb/hr | 6.3 | 4.3 |
| 5 Conc HCl In Aq Acid | wt % | 35.2 | 35.2 |
| 6 Conc NaClO3 in Aq Brine | wt % | 31.7 | 33.1 |
| 7 Conc NaCl in Aq Brine | wt % | 8.8 | 8.4 |
| 8 Conc Sodium Dichromate in Aq Brine | wt % | 0.00 | 0.00 |
| 9 Level control. rel'tv to bttm of sec gen | ft | 18.8 | 1 8.8 |
| Feed Ratio, (total Cl⁻)/NaClO3 | mol/mol | 0.63 | 0.54 |
| Liquid Level Above Feed Nozzles | ft | 2.0 | 1.5 |
| Pressure at bttm of generator, absolute | Torr | 715 | 789 |
| Temperatures | | | |
| Brine Feed | F. | 158 | 161 |
| Top Zone 4 | F. | 133 | 148 |
| Top Zone 3 | F. | 140 | 154 |
| Top Zone 2 | F. | 150 | 166 |
| Top Zone 1 | F. | 187 | 206 |

TABLE II-continued

| | | | |
|---|---|---|---|
| Bttm | F. | 208 | 223 |
| Combined Liquid Feeds | | | |
| Total Liquid Feedrate | lb/hr | 168 | 166 |
| HCl | wt % | 1.31% | 0.91% |
| NaClO3 | wt % | 30.5% | 32.2% |
| NaCl | wt % | 6.5% | 8.2% |
| Water | wt % | 59.7% | 58.7% |
| Estimated Specific Grav. at 38 C. | [] | 1.31 | 1.32 |
| Liquid Residence Time (superficial) | hr | 0.56 | 0.56 |
| Flows and Concentrations Out | | | |
| Final Liquid Product | lb/hr | 153 | 155 |
| HCl | wt % | 0.162% | 0.090% |
| NaClO3 | wt % | 30.7% | 31.7% |
| NaCl | wt % | 9.4% | 8.6% |
| Water | wt % | 59.6% | 59.6% |
| Cl2 | wt % | 0.013% | 0.008% |
| ClO2 | wt % | 0.062% | 0.027% |
| HCl Recovery | gpl | 2.1 | 1.2 |
| Combined Overheads | | | |
| Cl2 | lb/hr | 1.12 | 0.88 |
| ClO2 | lb/hr | 1.11 | 0.76 |
| Efficiencies | | | |
| Overhead (wet chem.) | % | 86.7% | 83.3% |
| Overhead (GC) | % | 83.5% | 81.1% |
| Hydrogen Chloride Conversion | % | 89% | 91% |

CONCLUSION

The invention is a dual-generator system for generating chlorine dioxide with the first generator being operated under substantially isothermal conditions with the second generator being operated to create a continuously increasing temperature gradient.

This differentiates the invention from all single generator designs. This also differentiates the invention from designs that have multiple generators, with each of the generators being operated at substantially isothermal conditions. The secondary generator also has characteristics which lend to the uniqueness of this invention.

The normal operation of the secondary generator differs from other reactor designs in that only one heat exchanger is used to establish a temperature gradient in the vessel with the driving force for the temperature gradient being rising steam and the limiting force being the vaporization temperature of the brine (which hydrostatically increases with depth below the free surface). In other designs, multiple heat exchangers are used to create this gradient, or the effect is not achieved by hydrostatic forces.

The secondary generator also uses vacuum (200 mmHg or less) at the free surface and hydrostatic pressure to adjust the temperature gradient so that maximum product selectivity is realized while achieving sufficient hydrogen chloride depletion.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. In combination, a dual generator, chlorine dioxide generating system comprising:

(I) a first generator for carrying out an incomplete isothermal reaction between reactants comprising an alkali metal chlorate/alkali metal chloride solution and a reducing agent at a first elevated temperature which is low enough to favor a chemical reaction for the production of chlorine dioxide, said first generator comprising:

(i) a first generally-cylindrical, upright vessel;

(ii) an upper radial inlet means for the entry of said reactants, said upper radial inlet means entering said first generally-cylindrical, upright vessel at a vertical location to provide both a lower liquid volume and an upper vapor space;

(iii) upper axial outlet means for the withdrawal of gaseous products of reaction;

(iv) lower radial outlet means for the withdrawal of a mixture of partially-reacted reactants and reaction products;

(v) lower axial outlet means for the withdrawal of a mixture of partially-reacted reactants and reaction products; and (vi) a heat exchanger loop connected between said lower axial outlet means and said upper radial inlet means, said heat exchanger loop including:

(a) a pump for the re-circulation of said withdrawn mixture of partially-reacted reactants and reaction products;

(b) an injection port for the injection of fresh said reactants comprising an alkali metal chlorate/alkali metal chloride solution;

(c) an indirect heat exchanger;

(d) conduit means connected to outlet means from said pump, said conduit means passing through said indirect heat exchanger;

(e) reducing agent inlet means to said heat exchanger loop for the injection of a solution of said reducing agent into said heat exchanger loop; and (f) means connecting said heat exchanger loop to said upper radial inlet means;

(II) an interconnected second generator for completing said reaction under a natural temperature gradient where downwardly-flowing reactants are heated from said first temperature to a temperature higher than said first temperature, thereby to complete the production of chlorine dioxide, said interconnected second generator comprising:

(vii) a second generally-cylindrical, upright vessel;

(viii) a radial inlet port for the introduction thereinto of a liquid mixture of partially-reacted reactants and reaction products withdrawn from said first generator, said radial inlet port entering said second generally-cylindrical, upright vessel at a vertical location to provide both a lower liquid volume and an upper vapor mixture space;

(ix) upper axial outlet means for the withdrawal of gaseous reaction products including chlorine dioxide;

(x) a plurality of spaced-apart, transverse, perforated baffles disposed within a lower portion of said second generally-cylindrical, upright vessel;

(xi) a lower, indirect heat exchanger for the heating of downwardly flowing said introduced mixture of partially-reacted reactants and reaction products, thereby to provide a countercurrent flow of upwardly-rising gaseous reaction products and (xii) lower, radial, outlet means for the withdrawal of reacted alkali metal chlorate/alkali metal chloride solution; and (III) interconnecting conduit means interconnected between said lower radial outlet means (v) from said first generator, for the withdrawal of a liquid mixture of partially-reacted reactants and reaction products, and said radial inlet means (viii), to said second generator, for the introduction of said liquid mixture of partially-reacted reactants and reaction products which has been withdrawn from said first generator.

2. The combination of claim 1 wherein, in said first generator, said first generally-cylindrical, upright vessel is formed of titanium.

3. The combination of claim 1 wherein, in said first generator, an upper portion of said first generally-cylindrical, upright vessel is formed of titanium, and wherein a lower portion of said first generally-cylindrical, upright vessel is formed of fluoropolymer-lined steel.

4. The combination of claim 1 wherein, in said heat exchanger loop, said injection port (b) is upstream of said indirect heat exchanger (c).

5. The combination of claim 1 wherein, in said heat exchanger loop, said reducing agent inlet means is downstream of said indirect heat exchanger (c).

6. The combination of claim 1 wherein said first generator includes an explosion-proof cover adjacent said upper axial gas outlet means.

7. The combination of claim 1 wherein said second generally, cylindrical, upright vessel comprises an upper generally-cylindrical, upright vessel, a frusto-conical interconnecting upright vessel open at both its upper end and its lower end which is integrally connected at its upper open end to a lower end of said upper generally-cylindrical, upright vessel, and a lower generally-cylindrical, upright vessel, integrally connected at its upper end to the lower open end of said frusto-conical interconnecting vessel, whereby said lower generally-cylindrical, upright vessel has a diameter less than said upper-generally-cylindrical, upright vessel.

8. The combination of claim 7 wherein, in said second generator, said upper cylindrical vessel includes an explosion-proof cover adjacent said upper axial outlet port.

9. The combination of claim 1 wherein said second generator includes:

(xii) a partially-cylindrical, upright, longitudinally-disposed axial baffle disposed between said lower indirect heat exchanger and said lower radial outlet means.

10. The combination of claim 1 wherein, in said second generator, said generally-cylindrical upright vessel is formed of titanium.

11. The combination of claim 1 wherein, in said second generator, said indirect heat exchanger is a tube bundle.

* * * * *